(12) United States Patent
Abe et al.

(10) Patent No.: US 11,016,281 B2
(45) Date of Patent: May 25, 2021

(54) IMAGING OPTICAL SYSTEM AND MICROSCOPE SYSTEM

(71) Applicant: OLYMPUS CORPORATION, Hachioji (JP)

(72) Inventors: Kenichiro Abe, Tokyo (JP); Atsushi Yonetani, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 219 days.

(21) Appl. No.: 16/385,680

(22) Filed: Apr. 16, 2019

(65) Prior Publication Data
US 2019/0324259 A1  Oct. 24, 2019

(30) Foreign Application Priority Data
Apr. 19, 2018 (JP) .............................. JP2018-080954

(51) Int. Cl.
*G02B 21/36* (2006.01)
*G02B 7/02* (2021.01)

(52) U.S. Cl.
CPC ........... *G02B 21/365* (2013.01); *G02B 7/021* (2013.01); *G02B 21/361* (2013.01); *G02B 21/362* (2013.01)

(58) Field of Classification Search
CPC .... G02B 21/02; G02B 21/361; G02B 21/362; G02B 21/365; G02B 7/021
See application file for complete search history.

(56) References Cited

U.S. PATENT DOCUMENTS

| 7,382,542 B2 | 6/2008 | Wartmann |
| 8,704,938 B2* | 4/2014 | Asakura .................. G02B 9/16 348/345 |
| 2007/0081231 A1 | 4/2007 | Shirota et al. |
| 2008/0149867 A1 | 6/2008 | Konishi et al. |
| 2009/0032732 A1 | 2/2009 | Konishi et al. |
| 2010/0177404 A1 | 7/2010 | Fujimoto |
| 2016/0116724 A1* | 4/2016 | Abe ....................... G02B 21/33 359/656 |

FOREIGN PATENT DOCUMENTS

| JP | 2007121837 A | 5/2007 |
| JP | 2008170969 A | 7/2008 |
| JP | 2010186162 A | 8/2010 |

* cited by examiner

*Primary Examiner* — William C Vaughn, Jr.
*Assistant Examiner* — Naod W Belai
(74) *Attorney, Agent, or Firm* — Holtz, Holtz & Volek PC

(57) ABSTRACT

An imaging optical system includes an objective, an image-formation optical system, and an image sensor, wherein an object, the objective, the image-formation optical system, and the image sensor are arranged in this order, the objective includes: a first lens group that includes a meniscus lens component that is the closest to an image among the first lens group, the meniscus lens component having a convex surface facing the object; and a second lens group that is closer to the image than the first lens group is, and the imaging optical system satisfies the following conditional expression:

$$4 \times 10^6 \leq PX_n \leq 1 \times 10^{10} \qquad (1)$$

where $PX_n$ indicates the number of pixels included in a region on the image sensor in which an MTF specific to an e line is 40% or higher at a spatial frequency of $750 \times NA_i$, and $NA_i$ indicates the numerical aperture of the image side of the imaging optical system.

20 Claims, 19 Drawing Sheets

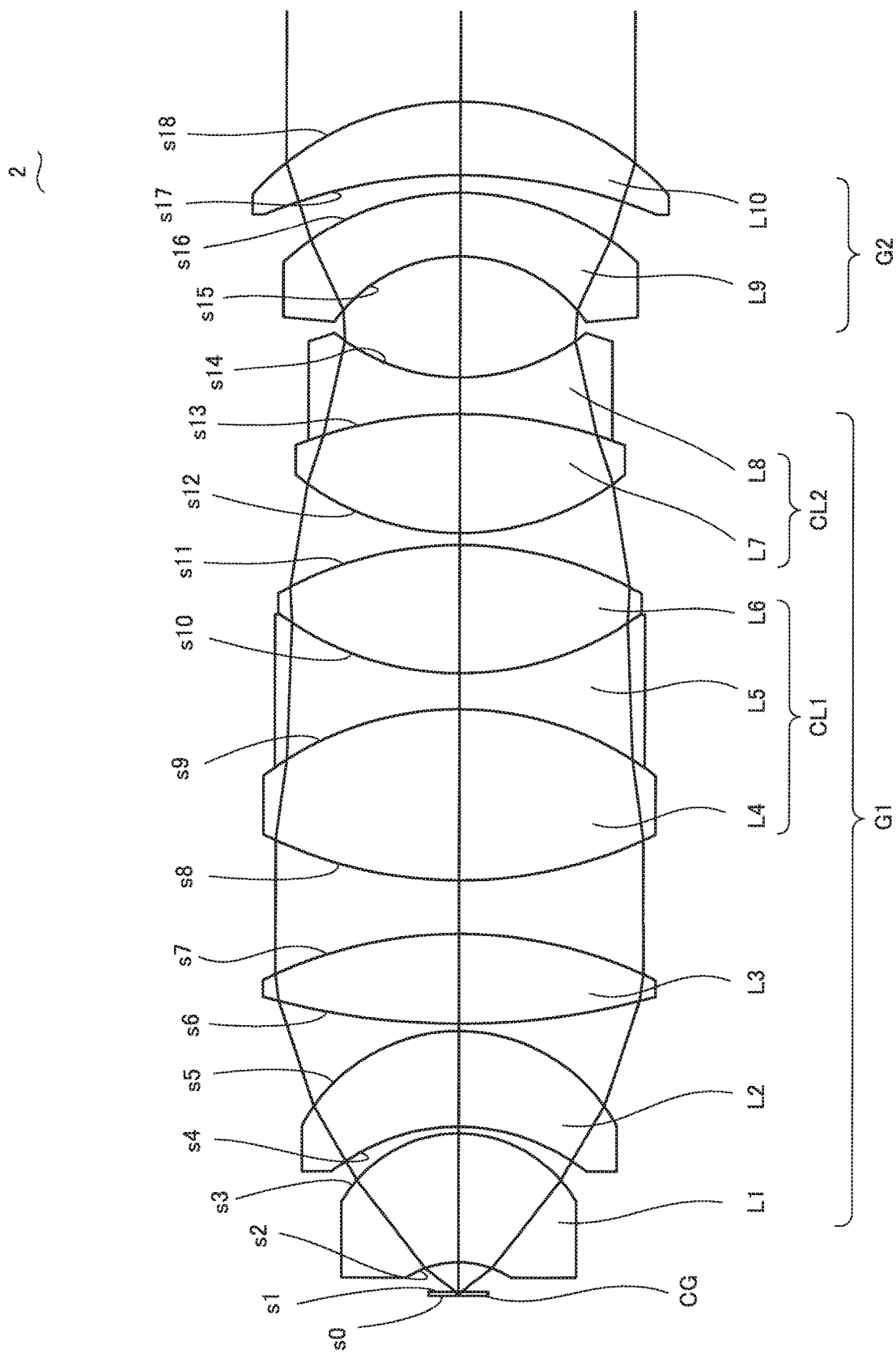
F I G. 6

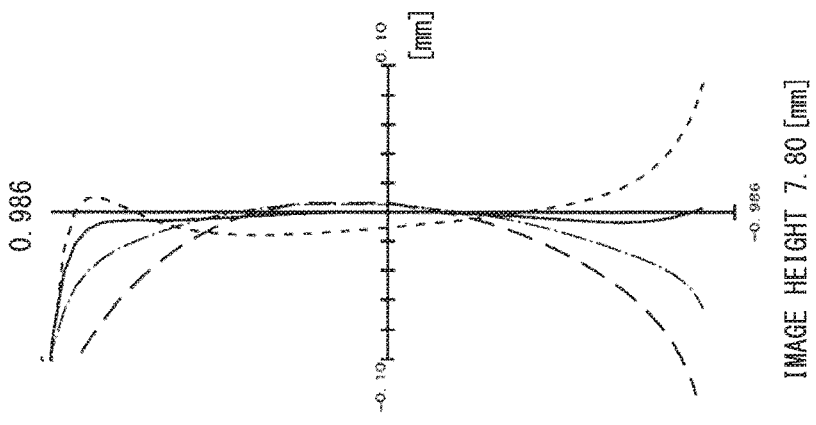
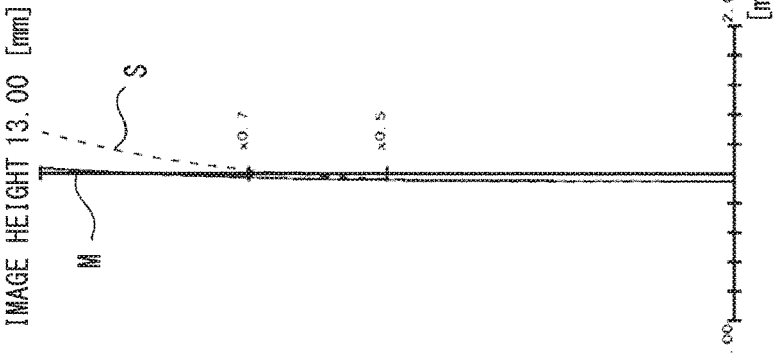
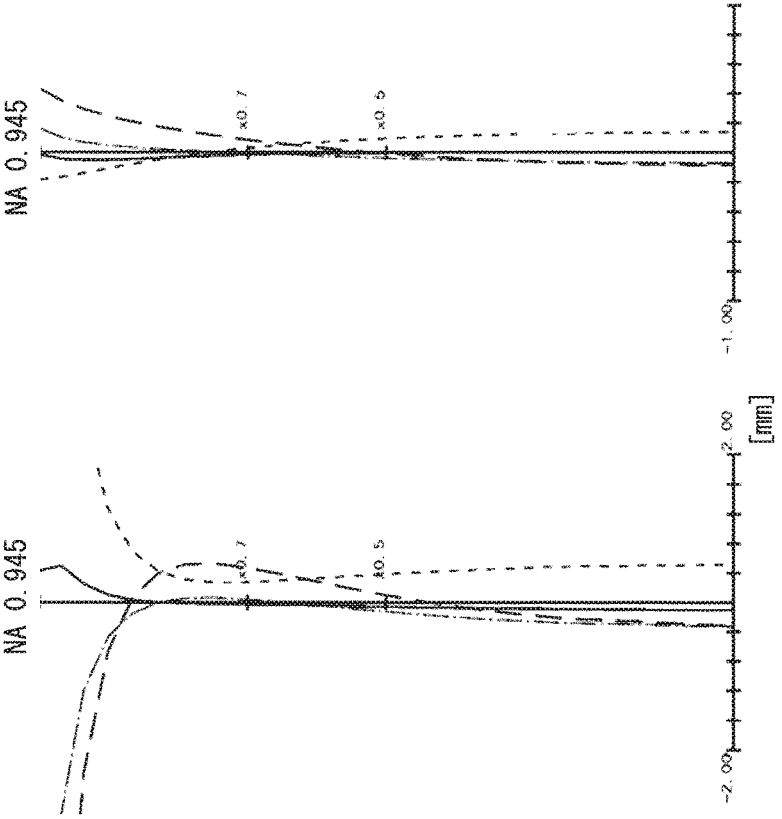

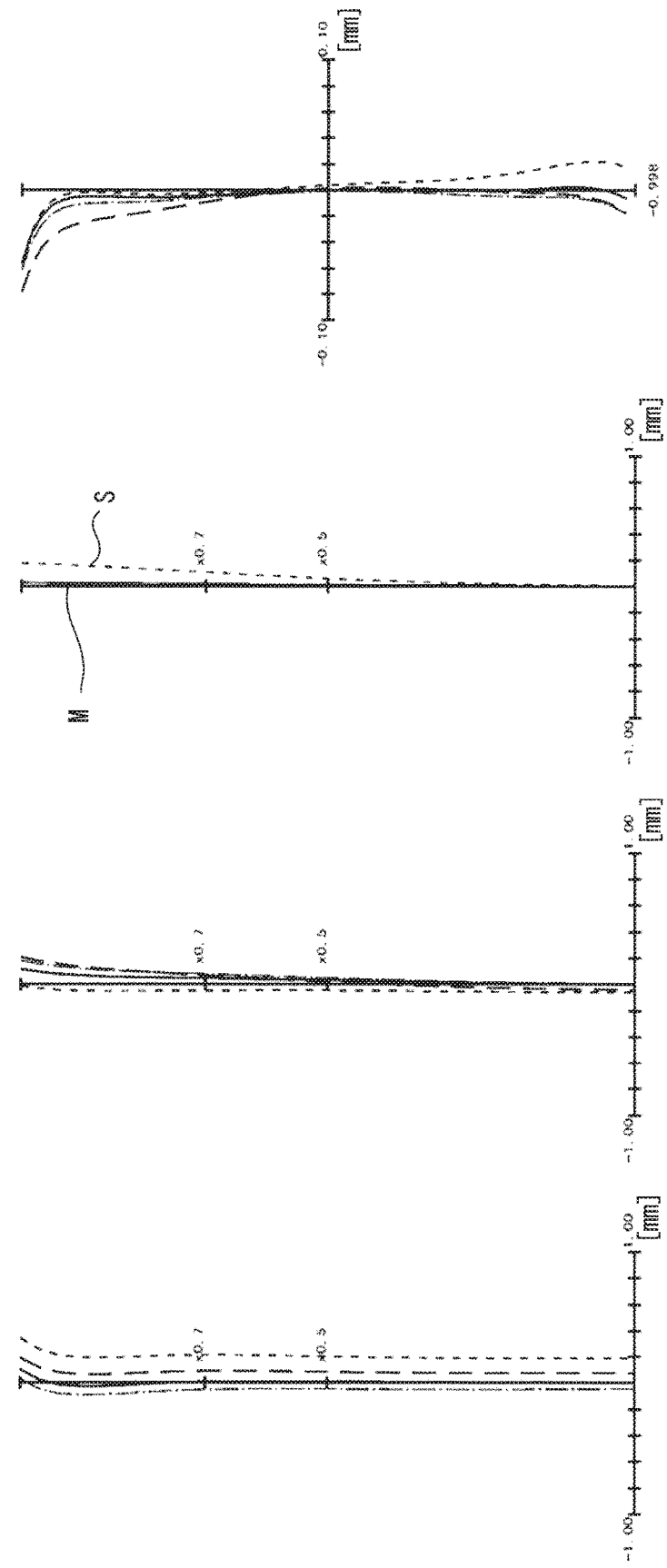

IMAGING OPTICAL SYSTEM AND MICROSCOPE SYSTEM

CROSS REFERENCE TO RELATED APPLICATIONS

This application is based upon and claims the benefit of priority from prior Japanese Patent Application No. 2018-080,954, filed Apr. 19, 2018, the entire contents of which are incorporated herein by this reference.

BACKGROUND OF THE INVENTION

Field of the Invention

The disclosure herein relates to an imaging optical system and a microscope system.

Description of the Related Art

In the field of microscopes, the use of observation and analysis of microscopic images captured by a digital camera has been expanded in addition to the use of visual observation using an eyepiece. A technique has also been used wherein a plurality of microscopic images having a high resolution are pieced together to construct a microscopic image corresponding to a wide region (hereinafter referred to as a virtual slide image).

Such a technique is described in, for example, Japanese Laid-open Patent Publication No. 2007-121,837. The use of the technique described in Japanese Laid-open Patent Publication No. 2007-121,837 has been expanded especially in pathological diagnoses, in which a wide region needs to be observed with a high resolving power without overlooking portions to be diagnosed.

SUMMARY OF THE INVENTION

An imaging optical system in accordance with an aspect of the present invention includes an objective, an image-formation optical system, and an image sensor, wherein an object, the objective, the image-formation optical system, and the image sensor are arranged in this order. The objective includes: a first lens group that includes a meniscus lens component that is the closest to an image among the lens components of the first lens group, the meniscus lens component having a convex surface facing the object; and a second lens group that is closer to the image than the first lens group is. The imaging optical system satisfies the following conditional expression:

$$4\times10^6 \leq PX_n \leq 1\times10^{10} \qquad (1)$$

In this conditional expression, $PX_n$ indicates the number of pixels included in a region on the imaging plane of the image sensor in which an MTF specific to an e line is 40% or higher, the MTF specific to the e line is an MTF achieved at a spatial frequency of $750\times NA_i$, and $NA_i$ indicates the numerical aperture of the image side of the imaging optical system.

A microscope system in accordance with an aspect of the present invention includes the imaging optical system in accordance with the above-described aspect and an image construction unit that constructs a virtual slide image by piecing together a plurality of first images captured by the imaging optical system. The microscope system satisfies the following conditional expression:

$$3.3\times10^6 \leq PX_i \leq 1\times10^{10} \qquad (9)$$

where $PX_i$ indicates the number of pixels that constitute each individual image of the plurality of first images.

BRIEF DESCRIPTION OF THE DRAWINGS

The present invention will be more apparent from the following detailed description when the accompanying drawings are referenced.

FIG. 6 is a cross-sectional view of an objective 2;
FIGS. 10A-10D are each an aberration diagram for an imaging optical system 30;
FIGS. 19A-19D are each an aberration diagram for an imaging optical system 60.

DESCRIPTION OF THE EMBODIMENTS

In recent years, there has been an increasing need to capture high-resolution microscopic images for a wide field of view and quickly construct a virtual slide image corresponding to a wide range with a high resolution by piecing these microscopic images together. Imaging optical systems that can have a high resolving power for a wider field of view than those in the prior art are necessary to meet such a need.

The following describes embodiments of the present invention.

Figure 1:
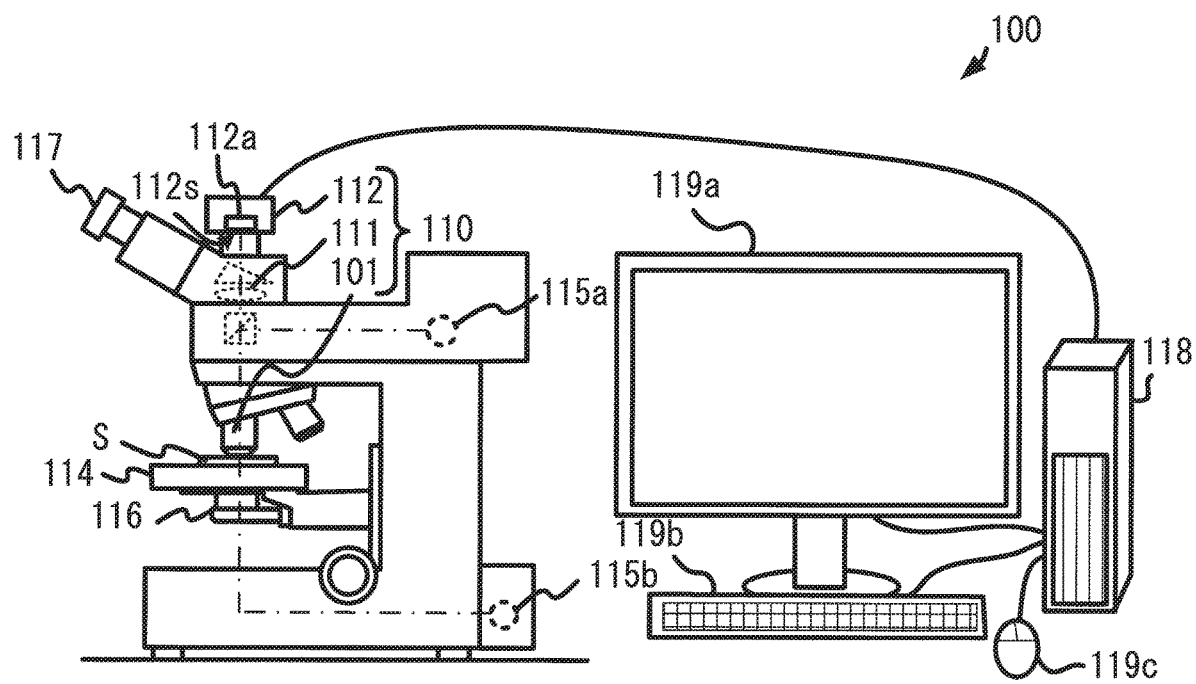
FIG. 1 illustrates the configuration of a microscope system 100 in accordance with an embodiment.

FIG. 1 illustrates the configuration of a microscope system 100 in accordance with an embodiment. The microscope system 100 includes: a microscope body provided with a digital camera 112; a computer 118; and input-output apparatuses (display 119a, keyboard 119b, and mouse 119c) connected to the computer 118.

The microscope body is, for example, a fluorescence microscope and includes an imaging optical system 110 that captures a microscopic image of a sample S. The imaging optical system 110 includes an objective 101, an image-formation optical system 111, and a digital camera 112 provided with an image sensor 112a, wherein the sample S, the objective 101, the image-formation optical system 111, and the digital camera 112 are arranged in this order. The microscope body further includes a stage 114 on which the sample S is to be placed, a light source 115a, a light source 115b, a condenser 116, and an eyepiece 117.

The objective 101 is an infinity-corrected microscope objective to be used in combination with the image-formation optical system 111. The image-formation optical system 111 converges a pencil of infinitely distant light rays emitted from the objective 101 and forms an optical image of the sample S on an imaging plane 112s of the image sensor 112a.

The image-formation optical system 111 may be a common single tube lens having a focal length of about 180-200 mm. The image-formation optical system 111 may be provided by coupling the tube lens to an adapter optical system that enlarges or reduces an image formed by the tube lens.

The digital camera 112 includes an image sensor 112a that converts incident light into an electric signal. The digital camera 112 generates image data of a microscopic image by shooting an image of the sample S and outputs the image data to the computer 118.

The stage 114 is, for example, a motorized stage. The stage 114 is not limited to a motorized stage but may be a manual stage.

The light source 115a is an epi-illumination light source. The light source 115a is, for example, a lamp light source such as a mercury vapor lamp or a xenon lamp. The light source 115b is a transmitted-illumination light source and is attached to a rear portion of the microscope body. When the microscope body is a laser scanning microscope, the light sources 115a and 115b may each be a laser light source.

The condenser 116 includes a condensing lens for irradiating the sample S with illumination light. A condenser to be placed on an optical path may be selected from a plurality of condensers mounted on a turret according to a microscopic method and/or an illumination range.

The eyepiece 117 is mounted in a trinocular lens barrel of the microscope body.

The microscope body depicted in FIG. 1 is an upright microscope. However, the microscope body may be an inverted microscope. The microscope body is not limited to a fluorescence microscope and may accommodate any microscopies such as a bright-field observation method, a dark-field observation method, a differential-interface-contrast observation method, and a phase-contrast observation method.

The computer 118 is, for example, a standard computer provided with a processor and a memory and communicably connected to the microscope body. By the processor running a program stored in the memory, the computer 118 functions as an image construction unit that constructs a virtual slide image by piecing together a plurality of microscopic images captured by the imaging optical system 110.

More particularly, the computer 118 changes the position of the sample S relative to the objective 101 by controlling the stage 114. In addition, the computer 118 captures a microscopic image of the sample S for the position after the change by controlling the digital camera 112. In this case, the stage 114 is controlled in a manner such that a field of view before the change and a field of view after the change partially overlap each other. This control process is repeated to capture a plurality of microscopic images. The computer 118 then determines piecing positions by performing an alignment process between the plurality of microscopic images and finally pieces the plurality of microscopic images together at these piecing positions. Accordingly, a virtual slide image that corresponds to a wide range on the sample S is constructed.

The computer 118 may designate an imaging range for the digital camera 112. In particular, the digital camera 112 may capture a microscopic image using only pixels of the image sensor 112a that are located within a region relatively close to an optical axis, i.e., a region for which aberrations are corrected in a preferable manner. This allows microscopic images having a high image quality for a range from the center to edge portions to be obtained so that a high image quality can also be achieved for the entirety of a virtual slide image constructed by piecing these microscopic images together.

The display 119a is, for example, a liquid crystal display, an organic light emitting display (OLED), a cathode ray tube (CRT) display. The display 119a displays an image on the basis of an image signal input from the computer 118.

The keyboard 119b and the mouse 119c, which are each an apparatus to be directly used by a user of the microscope system 100, outputs an operation signal that depends on user operations to the computer 118.

The microscope system 100 configured as described above is such that the imaging optical system 110 has a high resolving power for a wide field of view. Hence, a wide range can be imaged in a single image shooting operation so as to capture a microscopic image having a high resolution, and only a small number of image shooting operations need to be performed to construct a virtual slide image. Accordingly, a high-quality virtual slide image can be captured in a short time.

The following describes an imaging optical system 110 in accordance with an embodiment of the present application in detail.

As described above, the imaging optical system. 110 includes an objective 101, an image-formation optical system 111, and an image sensor 112a, wherein an object, the objective 101, the image-formation optical system 111, and the image sensor 112a are arranged in this order.

The objective 101 includes: a first lens group that includes a meniscus lens component that is the closest to an image among the lens components of the first lens group, the meniscus lens component having a convex surface facing the object; and a second lens group that is closer to the image than the first lens group is. More particularly, the meniscus lens component that is the closest to the image among the lens components of the first lens group has a lens outer diameter such that the lens outer diameter divided by a thickness that the meniscus lens component has on an optical axis is 4 or lower. When the meniscus lens component is a cemented lens, the outer diameter of the meniscus lens component refers to the outer diameter of a lens that is the closest to the image among the lenses that constitute the meniscus lens component. When the first lens group includes a plurality of meniscus lens components each having a lens outer diameter such that the lens outer diameter divided by a thickness that the meniscus lens component has on the optical axis is 4 or lower, the meniscus lens component that is the closest to the image among the lens components of the first lens group refers to the meniscus lens component that is the closest to the image among the plurality of meniscus lens components. A border between the first and second lens groups may be identified in accordance with this feature.

The first lens group applies a converging effect therewithin to a pencil of diverging light rays from an object point. Subsequently, the first lens group decreases a marginal ray height of the pencil of light rays within the meniscus lens component that is the closest to the image among the lens components of the first lens group and then emits the pencil of light rays from the concave surface of the meniscus lens component toward the second lens group. In addition, the second lens group turns the pencil of light rays from the first lens group into a pencil of parallel light rays. Accordingly, a Petzval sum can be corrected effectively, with the result that field curvatures can be corrected in a preferable manner for the entirety of a wide field of view.

The pencil of light rays herein refers to a pencil of light rays emitted from one point of an object (object point). Whether a single lens or a cemented lens, a lens component refers to one lens block that includes lens surfaces through which a light ray from an object point passes, wherein only a surface on an object side and a surface on an image side among these lens surfaces, i.e., only two of these lens surfaces, are in contact with air (or immersion liquid).

The image-formation optical system 111 has a positive refractive power overall and includes at least one lens component having a positive refractive power. The objective 101 and the image-formation optical system 111 form an infinity-corrected optical system such that the objective 101 and the image-formation optical system 111 can have a space formed therebetween through which essentially parallel light passes. Hence, while maintaining a preferable aberration performance, an optical component such as an optical filter or a dichroic mirror can be inserted into an optical path between the objective 101 and the image-formation optical system 111 on an as-needed basis.

The image sensor 112a is a solid-state image sensor and includes a plurality of pixels. The image sensor 112a desirably includes 4 million or more pixels to provide an image with a high resolution.

The imaging optical system 110 satisfies the following conditional expression:

$$4\times10^6 \leq PX_n \leq 1\times10^{10} \tag{1}$$

In this conditional expression, $PX_n$ indicates the number of pixels included in a region on the imaging plane 112s of the image sensor 112a in which an MTF specific to an e line is 40% or higher, wherein the MTF specific to the e line is an MTF achieved at a spatial frequency of 750×NA$_i$ and, more particularly, the lower of the MTF in a sagittal direction and the MTF in a meridional direction; and NA$_i$ indicates the numerical aperture of the image side of the imaging optical system 110.

More specifically, the imaging optical system 110 desirably satisfies conditional expression (1) when sample S is located at a position on the optical axis on the object side of the objective 101 at which an RMS wavefront aberration is minimized when parallel light is incident on the objective 101 from the image side and the image sensor 112a is positioned in a manner such that the imaging plane 112s is situated at a position at which an MTF at a spatial frequency of 750×NA$_i$ is maximized.

Satisfying conditional expression (1) allows microscopic images with a high resolution that correspond to a wide range on sample S to be captured.

If $PX_n$ becomes lower than a lower limit of conditional expression (1) with a pixel pitch maintained such that sampling can be performed at a predetermined frequency, this will decrease an image capturing range for which microscopic images can be captured with a sufficient resolving power. To construct a virtual slide image from these images, more microscopic images will be necessary, and hence it will take a long time to construct the virtual slide image. Meanwhile, if $PX_n$ becomes higher than an upper limit of conditional expression (1), the image sensor 112a will include excessively many pixels, and hence it will take a long time to capture images. If $PX_n$ becomes higher than the upper limit of conditional expression (1) with the size of the image sensor maintained within a predetermined range, each single pixel will have an excessively narrow light reception area. Hence, the image quality will be decreased.

The imaging optical system 110 configured as described above can achieve a high resolving power for a wide field of view and capture microscopic images with a high resolution that correspond to a wide range on sample S. In addition, the microscope system 100 can construct a high-quality virtual slide image in a short time by using microscopic images captured by the imaging optical system 110.

The imaging optical system 110 desirably satisfies conditional expression (1-1), (1-2), or (1-3) instead of conditional expression (1).

$$5.2\times10^6 \leq PX_n \leq 1\times10^9 \tag{1-1}$$

$$7.5\times10^6 \leq PX_n \leq 1\times10^9 \tag{1-2}$$

$$1.1\times10^7 \leq PX_n \leq 5\times10^8 \tag{1-3}$$

The imaging optical system 110 desirably further satisfies the following conditional expression:

$$400 \leq D/\varepsilon \leq 10000 \tag{2}$$

In this conditional expression, D indicates a diagonal length of the image sensor 112a, and ε indicates an Airy disk diameter for an e line on the imaging plane 112s and an optical axis.

Satisfying conditional expression (2) allows microscopic images that correspond to a wide range on sample S and have a high resolution to be captured.

If D/ε is lower than a lower limit of conditional expression (2), the objective 101 will have an excessively low numerical aperture and/or the digital camera 112 will have an excessively narrow image-capturable range. Hence, it will be difficult to capture microscopic images that correspond to a wide range on sample S and have a high resolution. If D/ε is higher than an upper limit of conditional expression (2), the image-capturable range will become excessively wide relative to the numerical aperture. This makes it difficult to maintain preferable aberration properties for a region up to the edge portions of the image sensor.

It is desirable that the first lens group of the objective 101 include a first lens component that is the closest to the object among the lens components of the first lens group and that has a convex surface facing the image. It is also desirable that the imaging optical system 110 satisfy the following conditional expression:

$$1.5 \leq n_1 \leq 1.85 \tag{3}$$

In this conditional expression, $n_1$ indicates the highest of the refractive indexes that the lenses included in the first lens component have for an e line.

By satisfying conditional expression (3), a spherical aberration can be corrected within the objective in a preferable manner, and a fluorescence observation can be performed at a short wavelength with a high resolving power. An optical material that has a high refractive index typically features high absorption and strong autofluorescence for a short wavelength. Accordingly, a material having a refractive index that is not excessively high is preferably used to achieve a high SN ratio in a fluorescence observation using excitation light having a short wavelength.

When $n_1$ is not higher than an upper limit of conditional expression (3), a fluorescence image with a high SN ratio is obtained such that a fluorescence observation and a structure analysis can be performed with a high resolving power.

When $n_1$ is not lower than a lower limit of conditional expression (3), divergence of light rays emitted from the first lens component can be limited while reducing generation of spherical aberrations in the first lens component. This allows the spherical aberrations to be corrected in a preferable manner throughout the objective.

The second lens group of the objective 101 desirably includes a plurality of lens components. An objective typically largely corrects a coma aberration by means of a lens component close to an image plane. By the second lens group including a plurality of lens components, the intervals between these lens components can be adjusted. Hence, a variation in a coma aberration that could be caused by a manufacturing error in, for example, the lens thickness or the radius of curvature can be appropriately compensated for by adjusting the intervals between the lens components of the second lens group.

The objective 101 desirably includes a cemented triplet lens. The imaging optical system 110 desirably satisfies the following conditional expression, where $NA_{ob}$ indicates the numerical aperture of the object side of the objective 101:

$$0.5 \leq NA_{ob} \tag{4}$$

An objective with a high numerical aperture that satisfies conditional expression (4) will have a short depth of focus. Hence, chromatic aberrations need to be corrected more accurately. By the objective 101 including a cemented triplet lens, the cemented triplet lens can function as an achromatic lens component such that chromatic aberrations can be corrected effectively by using the space within the objective 101 effectively. Disposing the achromatic lens component within a region in which a high marginal ray height is provided allows the achromatic lens component to achieve a sufficient function, but disposing the achromatic lens component within such a region will inevitably result in a large lens diameter. Using a cemented triplet lens as the achromatic lens component allows high lens component stiffness to be maintained even with a large lens diameter.

The cemented triplet lens desirably consists of a negative lens and two positive lenses having the negative lens situated therebetween. In particular, the cemented triplet lens desirably consists of a positive lens, a negative lens, and a positive lens, wherein an object, the positive lens, the negative lens, and the positive lens are arranged in this order.

The configuration of the positive-negative-positive cemented triplet lens allows the lens surfaces of the two sides of the negative lens to correct a chromatic aberration. Hence, the cemented triplet lens allows chromatic aberrations to be corrected more effectively.

The objective 101 may be an immersion objective that satisfies conditional expression (5). In this case, the imaging optical system 110 desirably satisfies conditional expression (6), where $f_{ob}$ indicates a focal length that the objective 101 has for an e line, and $f_1$ indicates a focal length that the first lens component has for the e line.

$$1 \leq NA_{ob} \tag{5}$$

$$-0.2 \leq f_{ob}/f_1 \leq 0.43 \tag{6}$$

The immersion objective with a high numerical aperture that satisfies conditional expression (5) needs to limit divergence of light rays while considerably reducing generation of spherical aberrations. By satisfying conditional expression (6), the objective 101 can correct spherical aberrations and axial chromatic aberrations effectively while correcting the Petzval sum in a more preferable manner.

When $f_{ob}/f_1$ is not lower than a lower limit of conditional expression (6), divergence of a pencil of light rays emitted from the first lens component can be prevented from becoming excessively large. Hence, an axial marginal ray height does not become excessively high within the optical systems closer to an image than the first lens component is (hereinafter referred to as optical systems of the second lens component and the following optical systems), so that spherical aberrations and axial chromatic aberrations can be corrected in a preferable manner. When $f_{ob}/f_1$ is not higher than an upper limit of conditional expression (6), a difference of elevation in axial marginal ray height can be easily provided within the optical systems of the second lens component and the following optical systems. Hence, the Petzval sum can be corrected in a preferable manner. In particular, the lens surface that is the closest to the object among the lens surfaces of the immersion objective is in contact with an immersion liquid, and hence a refractive index difference becomes small, with the result that the first lens component cannot remarkably correct the Petzval sum. Accordingly, it is desirable that the optical systems of the second lens component and the following optical systems correct the Petzval sum.

The imaging optical system 110 desirably satisfies conditional expression (6-1) or (6-2) instead of conditional expression (6).

$$-0.1 \leq f_{ob}/f_1 \leq 0.38 \tag{6-1}$$

$$0 \leq f_{ob}/f_1 \leq 0.34 \tag{6-2}$$

The second lens group of the objective 101 desirably includes a second-group first lens component that is the closest to the object among the lens components of the second lens group. The imaging optical system 110 desirably satisfies the following conditional expression:

$$0.39 \leq (h_2 - h_1)/t_1 \leq 0.7 \tag{7}$$

In this conditional expression, $h_1$ indicates the height of an axial marginal ray at the lens surface on the object side of the second-group first lens component, $h_2$ indicates the height of an axial marginal ray at the lens surface on the image side of the second-group first lens component, and $t_1$ indicates a thickness that the second-group first lens component has on the optical axis.

Satisfying conditional expression (7) allows coma aberrations and field curvatures to be corrected within the objective in a preferable manner. More particularly, when $(h_2-h_1)/t_1$ is not lower than a lower limit of conditional expression (7), the height of a marginal ray can be largely changed within the second-group first lens component. Hence, field curvatures can be sufficiently corrected, with the result that a high resolution can be maintained for a region up to edge portions. When $(h_2-h_1)/t_1$ is not higher than an upper limit of conditional expression (7), a light ray can be prevented from forming an excessively large refractive angle at the object-side (incidence-side) lens surface or image-side (emission-side) lens surface of the second-group first lens component. Hence, the occurrence of high-order spherical aberrations and coma aberrations can be reduced, with the result that a high resolution can be maintained for a region up to edge portions.

The imaging optical system 110 desirably satisfies conditional expression (7-1) instead of conditional expression (7).

$$0.43 \leq (h_2 - h_1)/t_1 \leq 0.6 \tag{7-1}$$

The objective 101 may be a dry objective that satisfies conditional expression (8). In this case, the objective desirably includes at least one lens component that can be moved along an optical axis.

$$0.85 \leq NA_{ob} < 1 \tag{8}$$

The dry objective with a high numerical aperture that satisfies conditional expression (8) has a spherical aberration that is largely varied when a slight change is made in the thickness or refractive index of cover glass. By the objective including at least one lens component that can be moved along the optical axis (hereinafter referred to as a movable lens component), variations in spherical aberrations can be compensated for in accordance with the movement of the movable lens component.

The microscope system 100 provided with the imaging optical system 110 configured as described above desirably satisfies the following conditional expression:

$$3.3 \times 10^6 \leq PX_i \leq 1 \times 10^{10} \tag{9}$$

In this conditional expression, $PX_i$ indicates the number of pixels that constitute each individual microscopic image of a plurality of microscopic images captured by the imaging optical system 110 that are to be pieced together when the computer 118 constructs a virtual slide image (hereinafter referred to as first images). When the computer 118 has designated an imaging range for the digital camera 112, $PX_i$ indicates a pixel count that corresponds to this imaging range. When the computer 118 extracts portions of a microscopic image captured by the digital camera 112 and performs piecing process for these portions, $PX_i$ indicates a pixel count that corresponds to the extracted portions of the microscopic image.

Satisfying conditional expression (9) allows a virtual slide image to be constructed in a short time. More specifically, when $PX_i$ is not lower than a lower limit of conditional expression (9), a wide imaging range can be set so that the number of images that need to be captured to construct a virtual slide image can be decreased, with the result that the virtual slide image can be constructed in a short time. When $PX_i$ is not higher than an upper limit of conditional expression (9), the image sensor 112a do not have excessively many pixels, and hence it will not take an excessively long time to capture a single image.

The objective may use only one of the above-described conditional expressions or may use a combination of conditional expressions freely selected from these conditional expressions, and any combination can be used to achieve sufficiently advantageous effects. The upper and lower limits of the conditional expressions may each be independently changed to provide a new conditional expression which will also achieve similar advantageous effects.

The following specifically describes embodiments of the imaging optical system 110.

First Embodiment

Figure 2:
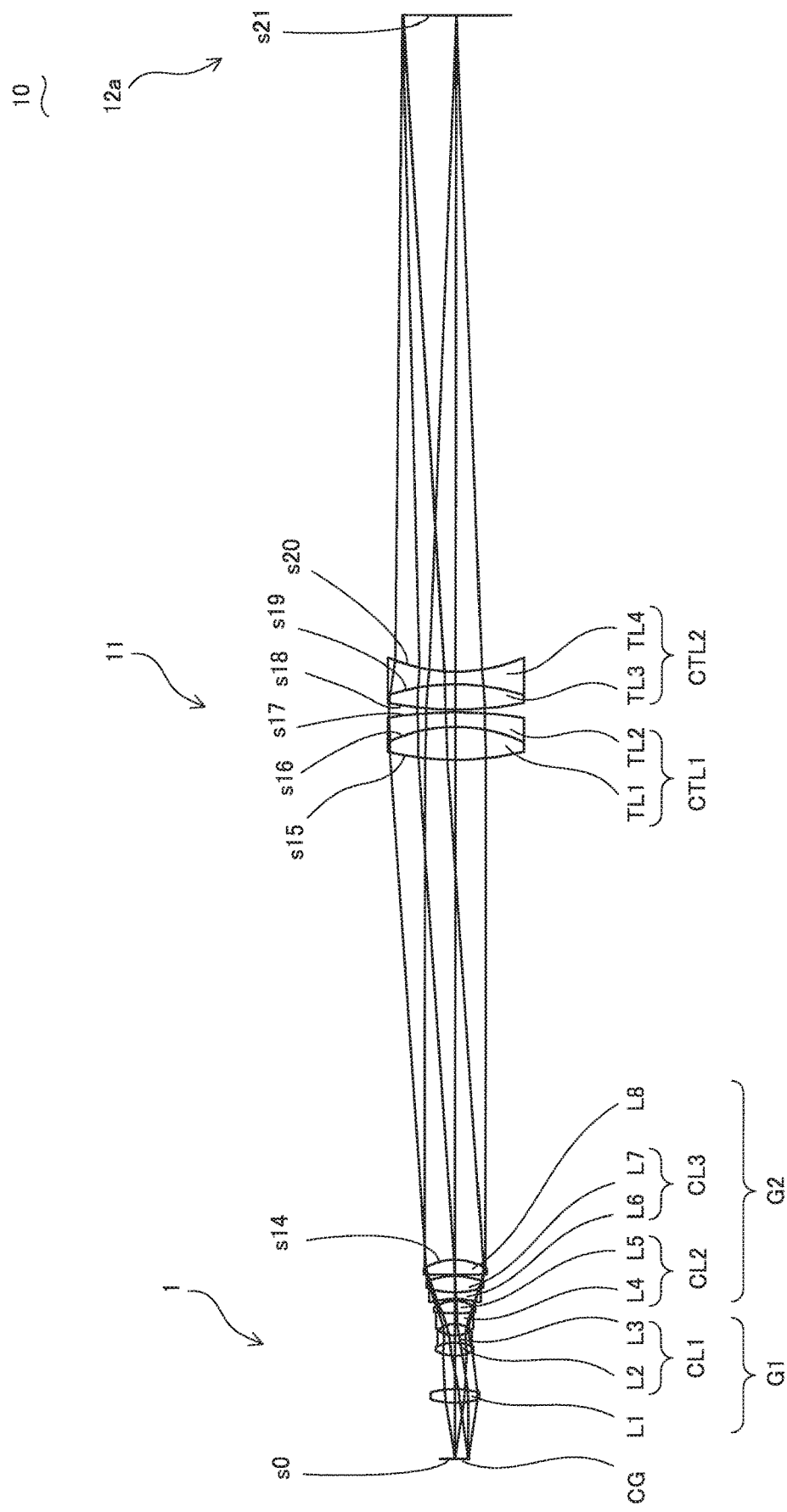
FIG. 2 is a cross-sectional view of an imaging optical system 10.
Figure 3:
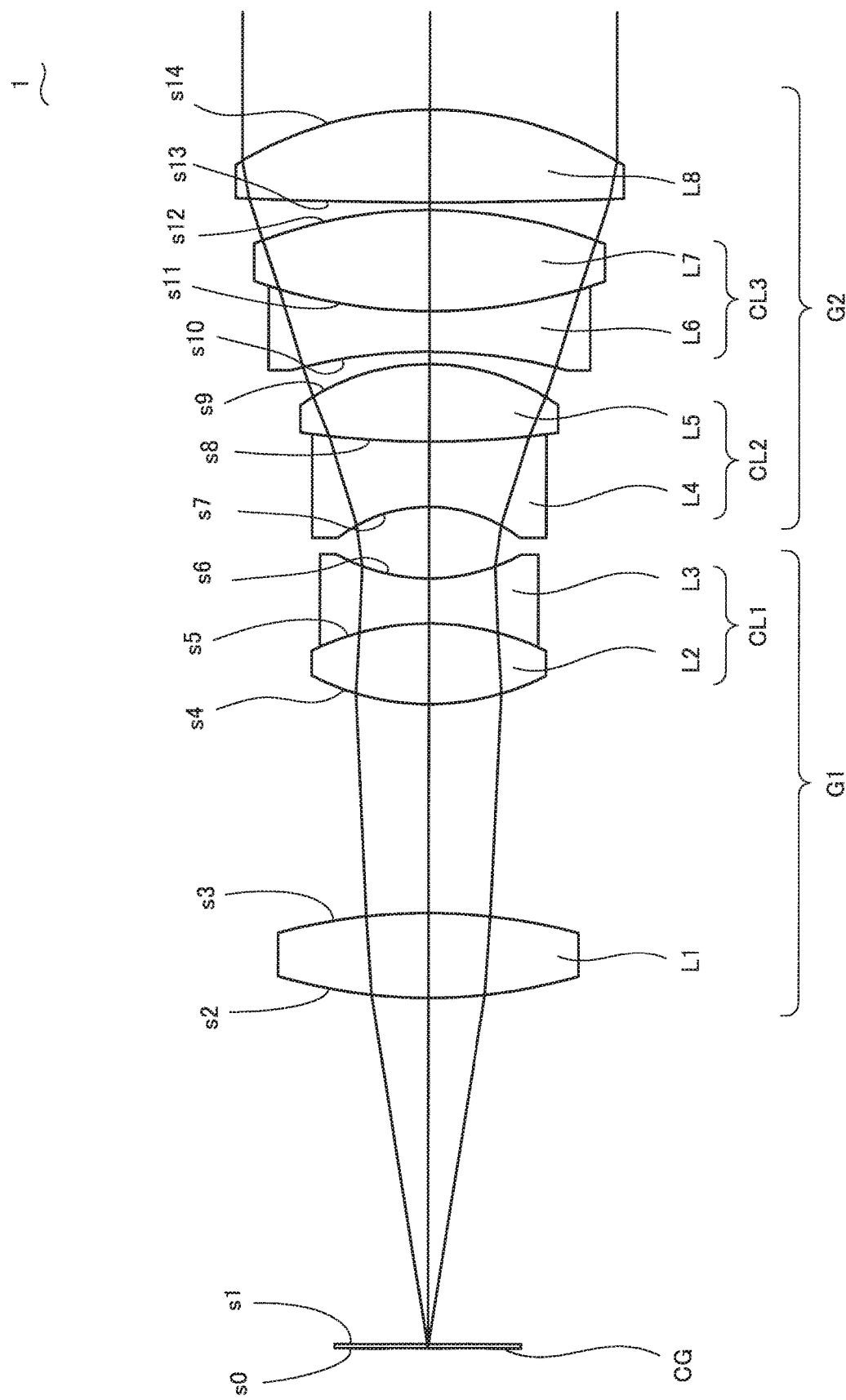
FIG. 3 is a cross-sectional view of an objective 1.

FIG. 2 is a cross-sectional view of an imaging optical system 10 in accordance with the present embodiment. FIG. 3 is a cross-sectional view of an objective 1 in accordance with this embodiment. As depicted in FIG. 2, the imaging optical system 10 includes the objective 1, an image-formation optical system 11, and an image sensor 12a, wherein an object, the objective 1, the image-formation optical system 11, and the image sensor 12a are arranged in this order.

As depicted in FIG. 3, the objective 1 includes: a first lens group G1 that includes a meniscus lens component that is the closest to an image among the lens components of the first lens group G1, the meniscus lens component having a convex surface facing the object; and a second lens group G2 that is closer to the image than the first lens group G1 is. The objective 1 is a dry microscope objective.

The first lens group G1 includes a lens L1 that is a biconvex lens and a cemented lens CL1, wherein the object, the lens L1, and the cemented lens CL1 are arranged in this order. The lens L1 is a first lens component of the objective 1. The cemented lens CL1 is a cemented doublet lens and consists of a lens L2 that is a biconvex lens and a lens L3 that is a biconcave lens, wherein the object, the lens L2, and the lens L3 are arranged in this order. The cemented lens CL1 is a meniscus lens component having a convex surface facing the object.

The second lens group G2 includes a cemented lens CL2, a cemented lens CL3, and a lens L8 that is a biconvex lens, wherein the object, the cemented lens CL2, the cemented lens CL3, and the lens L8 are arranged in this order. The cemented lens CL2 is a cemented doublet lens and consists of a lens L4 that is a biconcave lens and a lens L5 that is a biconvex lens, wherein the object, the lens L4, and the lens L5 are arranged in this order. The cemented lens CL2 is a second-group first lens component of the objective 1. The cemented lens CL3 is a cemented doublet lens and consists of a lens L6 that is a biconcave lens and a lens L7 that is a biconvex lens, wherein the object, the lens L6, and the lens L7 are arranged in this order.

As depicted in FIG. 2, the image-formation optical system 11 includes a cemented lens CTL1 and a cemented lens CTL2, wherein the object, the cemented lens CTL1, and the cemented lens CTL2 are arranged in this order. The cemented lens CTL1 consists of a lens TL1 that is a biconvex lens and a lens TL2 that is a meniscus lens having a concave surface facing the object. The cemented lens CTL2 consists of a lens TL3 that is a biconvex lens and a lens TL4 that is a biconcave lens.

The following are various data on the imaging optical system 10, where $f_{TL}$ indicates the focal length of the image-formation optical system 11, $f_{G1}$ indicates a focal length that the first lens group of the objective 1 has for an e line, $f_{G2}$ indicates a focal length that the second lens group of the objective 1 has for the e line, β indicates the magnification of the imaging optical system 10, and $\Phi_1$ indicates the outer diameter of the biconcave lens L3, i.e., the lens that is the closest to the image among the lenses constituting the cemented lens CL1, wherein the cemented lens CL1 is the meniscus lens component that is the closest to the image among the lens components of the first lens group G1.

$NA_{ob}$=0.160, $NA_i$=0.040, |β|=4, $f_{ob}$=45.000 mm, $f_{TL}$=180 mm, $f_{G1}$=21.637 mm, $f_{G2}$=56.531 mm, $f_1$=21.069 mm, $n_1$=1.51825, $h_1$=2.78 mm, $h_2$=4.475 mm, $t_1$=5.5 mm, D=26 mm, ε=0.017 mm, $\Phi_1$=9 mm, $PX_n$≤=7.7×10$^6$, $PX_i$=7.4×10$^6$

Various data on the image sensor 12a included in the imaging optical system 10 are as follows, where $S_H$, $S_V$, and $S_D$ respectively indicate the long side length, short side length, and diagonal length of the image sensor 12a, $N_H$, $N_V$, and $N_D$ respectively indicate the long side pixel count, short side pixel count, and total pixel count of the image sensor 12a, and P indicates a pixel pitch.

$S_H$=20.8 mm, $S_V$=15.6 mm, $S_D$=25.6 mm, $N_H$=3200, $N_V$=2400, $N_D$=7.7×10$^6$, P=6.5 μm

The following are lens data of the imaging optical system 10. INF in the lens data indicates infinity (∞).

| Imaging optical system 10 | | | | |
|---|---|---|---|---|
| s | r | d | ne | vd |
| 0 | INF | 0.170 | 1.52626 | 54.41 |
| 1 | INF | 13.244 | | |
| 2 | 20.4097 | 3.268 | 1.51825 | 64.14 |
| 3 | −22.1977 | 8.021 | | |
| 4 | 9.8755 | 3.090 | 1.43986 | 94.66 |
| 5 | −10.1728 | 1.733 | 1.51825 | 64.14 |
| 6 | 7.3477 | 2.746 | | |
| 7 | −5.7177 | 2.523 | 1.75844 | 52.32 |
| 8 | 36.266 | 2.977 | 1.43986 | 94.66 |
| 9 | −8.5226 | 0.471 | | |
| 10 | −20.1257 | 1.561 | 1.48915 | 70.23 |
| 11 | 20.4365 | 3.897 | 1.43986 | 94.66 |
| 12 | −18.1858 | 0.301 | | |
| 13 | 185.9612 | 3.570 | 1.49846 | 81.54 |
| 14 | −14.0427 | 119.000 | | |
| 15 | 68.7541 | 7.732 | 1.48915 | 70.21 |
| 16 | −37.5679 | 3.474 | 1.81077 | 40.95 |
| 17 | −102.8477 | 0.697 | | |
| 18 | 84.3099 | 6.024 | 1.83932 | 37.17 |
| 19 | −50.71 | 3.030 | 1.64825 | 40.82 |
| 20 | 40.6619 | 156.927 | | |
| 21 | INF | | | | s indicates a surface number; r, a radius of curvature (mm); d, a surface interval (mm); ne, a refractive index for an e line; vd, an Abbe number. These marks are also applicable to the embodiments described hereinafter. Surface numbers s0 and s1 respectively indicate an object surface (surface of cover glass CG on an object side) and a surface of the cover glass CG on an image side. Surface numbers s2 and s14 respectively indicate a lens surface that is the closest to an object among the lens surfaces of the objective 1 and a lens surface that is the closest to an image among the lens surfaces of the objective 1. Surface numbers s15 and s20 respectively indicate a lens surface that is the closest to the object among the lens surfaces of the image-formation optical system 11 and a lens surface that is the closest to the image among the lens surfaces of the image-formation optical system 11. Surface number s21 indicates the imaging plane of the image sensor 12a.

As indicated in the following, the imaging optical system 10 satisfies conditional expressions (1)-(3) and (9).

$$PX_n \leq = 7.7 \times 10^6 \quad (1)$$

$$D/\varepsilon = 1561 \quad (2)$$

$$n_1 = 1.51825 \quad (3)$$

$$NA_{ob} = 0.160 \quad (4), (5), (8)$$

$$f_{ob}/f_1 = 2.136 \quad (6)$$

$$(h_2 - h_1)/t_1 = 0.31 \quad (7)$$

$$PX_i = 7.4 \times 10^6 \quad (9)$$

Figure 4:
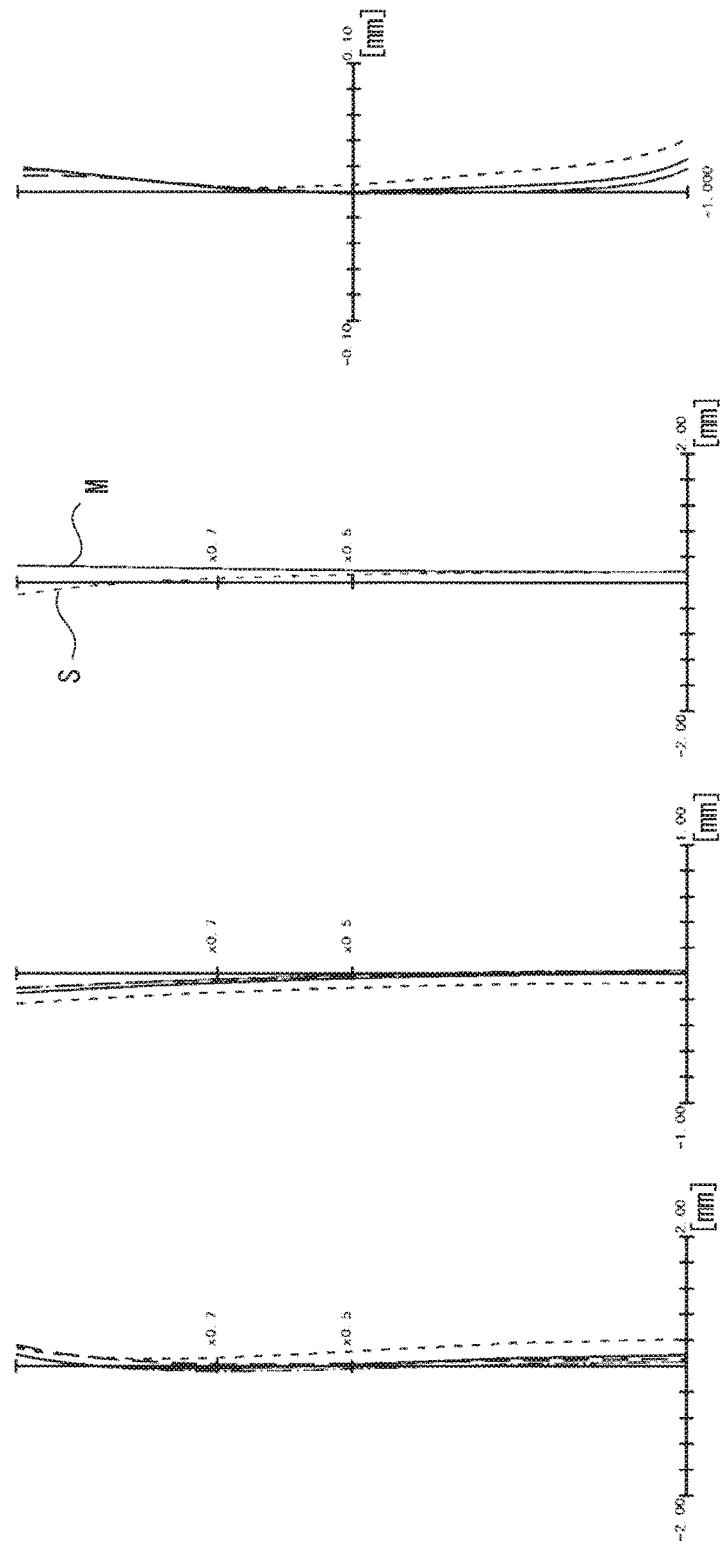
FIGS. 4A-4D are each an aberration diagram for an imaging optical system 10.

FIGS. 4A-4D are each an aberration diagram for the imaging optical system 10 depicted in FIG. 2 and indicate aberrations that occur on the image plane of the image sensor 12a. FIG. 4A is a spherical aberration diagram. FIG. 4B illustrates a sine-condition violation amount. FIG. 4C is an astigmatism diagram. FIG. 4D is a coma aberration diagram for a position with an image height ratio of 0.6 (image height 7.80 mm). "M" in the figures indicates a meridional component, and "S" indicates a sagittal component.

Second Embodiment

Figure 5:
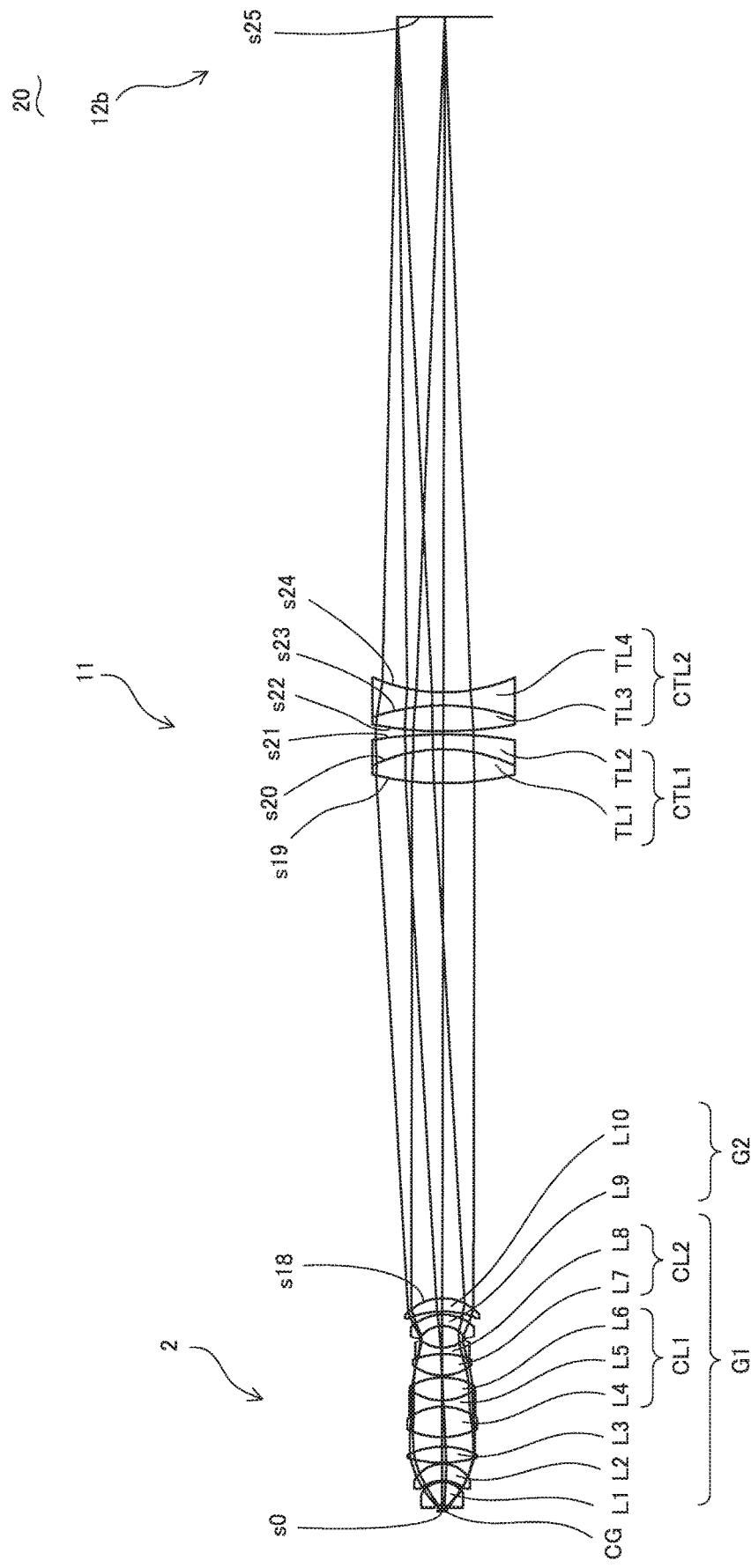
FIG. 5 is a cross-sectional view of an imaging optical system 20.

FIG. 5 is a cross-sectional view of an imaging optical system 20 in accordance with the present embodiment. FIG. 6 is a cross-sectional view of an objective 2 in accordance with this embodiment. As depicted in FIG. 5, the imaging optical system 20 includes the objective 2, an image-formation optical system 11, and an image sensor 12b, wherein an object, the objective 2, the image-formation optical system 11, and the image sensor 12b are arranged in this order. The image-formation optical system 11 in the present embodiment is similar to that in the first embodiment.

As depicted in FIG. 6, the objective 2 includes: a first lens group G1 that includes a meniscus lens component that is the closest to an image among the lens components of the first lens group G1, the meniscus lens component having a convex surface facing the object; and a second lens group G2 that is closer to the image than the first lens group G1 is. The objective 2 is a dry microscope objective.

The first lens group G1 includes a lens L1 that is a meniscus lens having a concave surface facing the object, a lens L2 that is a meniscus lens having a concave surface facing the object, a lens L3 that is a biconvex lens, a cemented lens CL1, and a cemented lens CL2, wherein the object, the lens L1, the lens L2, the lens L3, the cemented lens CL1, and the cemented lens CL2 are arranged in this order.

The lens L1 is a first lens component of the objective 2. The cemented lens CL1 is a cemented triplet lens and consists of a lens L4 that is a biconvex lens, a lens L5 that is a biconcave lens, and a lens L6 that is a biconvex lens, wherein the object, the lens L4, the lens L5, and the lens L6 are arranged in this order. The cemented lens CL2 is a cemented doublet lens and consists of a lens L7 that is a biconvex lens and a lens L8 that is a biconcave lens, wherein the object, the lens L7, and the lens L8 are arranged in this order. The cemented lens CL2 is a meniscus lens component having a convex surface facing the object.

The second lens group G2 includes a lens L9 that is a meniscus lens having a concave surface facing the object and a lens L10 that is a meniscus lens having a concave surface facing the object, wherein the object, the lens L9, and the lens L10 are arranged in this order. The lens L9 is a second-group first lens component of the objective 2.

The following are various data on the imaging optical system 20, where $\Phi_1$ indicates the outer diameter of the biconcave lens L8, i.e., the lens that is the closest to the image among the lenses constituting the cemented lens CL2, wherein the cemented lens CL2 is the meniscus lens component that is the closest to the image among the lens components of the first lens group G1.

$NA_{ob}=0.800$, $NA_i=0.040$, $|\beta|=20$, $f_{OB}=9.000$ mm, $f_{TL}=180$ mm, $f_{G1}=5.805$ mm, $f_{G2}=109.708$ mm, $f_1=36.36$ mm, $n_1=1.77621$, $h_1=4.843$ mm, $h_2=6.193$ mm, $t_1=2.646$ mm, $D=22$ mm, $\varepsilon=0.017$ mm, $\Phi_1=13$ mm, $PX_n \leq =1.1 \times 10^7$, $PX_i=8.9 \times 10^6$ Various data on the image sensor 12b included in the imaging optical system 20 are as follows.

$S_H=17.6$ mm, $S_V=13.2$ mm, $S_D=22.0$ mm, $N_H=3910$, $N_V=2932$, $N_D=1.15 \times 10^7$, $P=4.5$ μm The following are lens data of the imaging optical system 20.

Imaging optical system 20

| s | r | d | ne | vd |
|---|---|---|---|---|
| 0 | INF | 0.170 | 1.52626 | 54.41 |
| 1 | INF | 1.220 | | |
| 2 | −4.0367 | 5.316 | 1.77621 | 49.6 |
| 3 | −5.5638 | 0.278 | | |
| 4 | −8.3753 | 3.921 | 1.43986 | 94.66 |
| 5 | −7.3726 | 0.296 | | |
| 6 | 30.0778 | 3.701 | 1.43986 | 94.66 |
| 7 | −18.1688 | 2.218 | | |
| 8 | 18.2379 | 7.051 | 1.43986 | 94.66 |
| 9 | −13.3079 | 1.500 | 1.64132 | 42.41 |
| 10 | 12.5928 | 5.289 | 1.43986 | 94.66 |
| 11 | −15.1109 | 0.497 | | |
| 12 | 10.8229 | 4.943 | 1.43986 | 94.66 |
| 13 | −18.5 | 1.500 | 1.64132 | 42.41 |
| 14 | 8.2723 | 5.000 | | |
| 15 | −6.3912 | 2.646 | 1.74435 | 52.64 |
| 16 | −10.7265 | 0.731 | | |
| 17 | −20.9997 | 3.049 | 1.74341 | 32.26 |
| 18 | −11.4968 | 119.000 | | |
| 19 | 68.7541 | 7.732 | 1.48915 | 70.21 |
| 20 | −37.5679 | 3.474 | 1.81077 | 40.95 |
| 21 | −102.8477 | 0.697 | | |
| 22 | 84.3099 | 6.024 | 1.83932 | 37.17 |
| 23 | −50.71 | 3.030 | 1.64825 | 40.82 |
| 24 | 40.6619 | 156.927 | | |
| 25 | INF | | | |

Surface numbers s0 and s1 respectively indicate an object surface (surface of cover glass CG on an object side) and a surface of the cover glass CG on an image side. Surface numbers s2 and s18 respectively indicate a lens surface that is the closest to an object among the lens surfaces of the objective 2 and a lens surface that is the closest to an image among the lens surfaces of the objective 2. Surface numbers s19 and s24 respectively indicate a lens surface that is the closest to the object among the lens surfaces of the image-formation optical system 11 and a lens surface that is the closest to the image among the lens surfaces of the image-formation optical system 11. Surface number s25 indicates the imaging plane of the image sensor 12$b$.

As indicated in the following, the imaging optical system 20 satisfies conditional expressions (1)-(9), excluding conditional expressions (5) and (8).

$$PX_n \leq 1.1 \times 10^7 \quad (1)$$

$$D/\varepsilon = 1321 \quad (2)$$

$$n_1 = 1.77621 \quad (3)$$

$$NA_{ob} = 0.800 \quad (4), (5), (8)$$

$$f_{ob}/f_1 = 0.248 \quad (6)$$

$$(h_2 - h_1)/t_1 = 0.51 \quad (7)$$

$$PX_i = 8.9 \times 10^6 \quad (9)$$

Figures 7A, 7B, 7C, 7D:
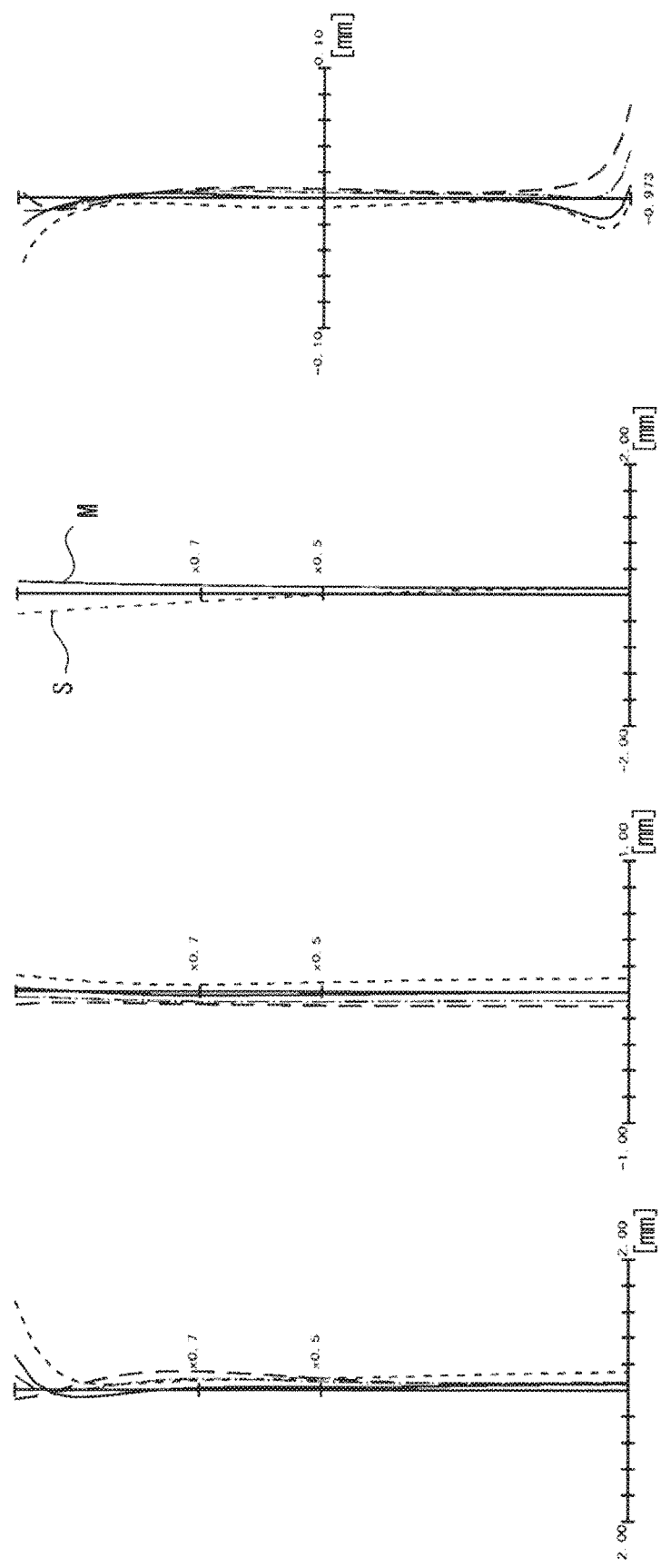
FIGS. 7A-7D are each an aberration diagram for an imaging optical system 20.

FIGS. 7A-7D are each an aberration diagram for the imaging optical system 20 depicted in FIG. 5 and indicate aberrations that occur on the image plane of the image sensor 12$b$. FIG. 7A is a spherical aberration diagram. FIG. 7B illustrates a sine-condition violation amount. FIG. 7C is an astigmatism diagram. FIG. 7D is a coma aberration diagram for a position with an image height ratio of 0.6 (image height 6.60 mm).

Third Embodiment

Figure 8:
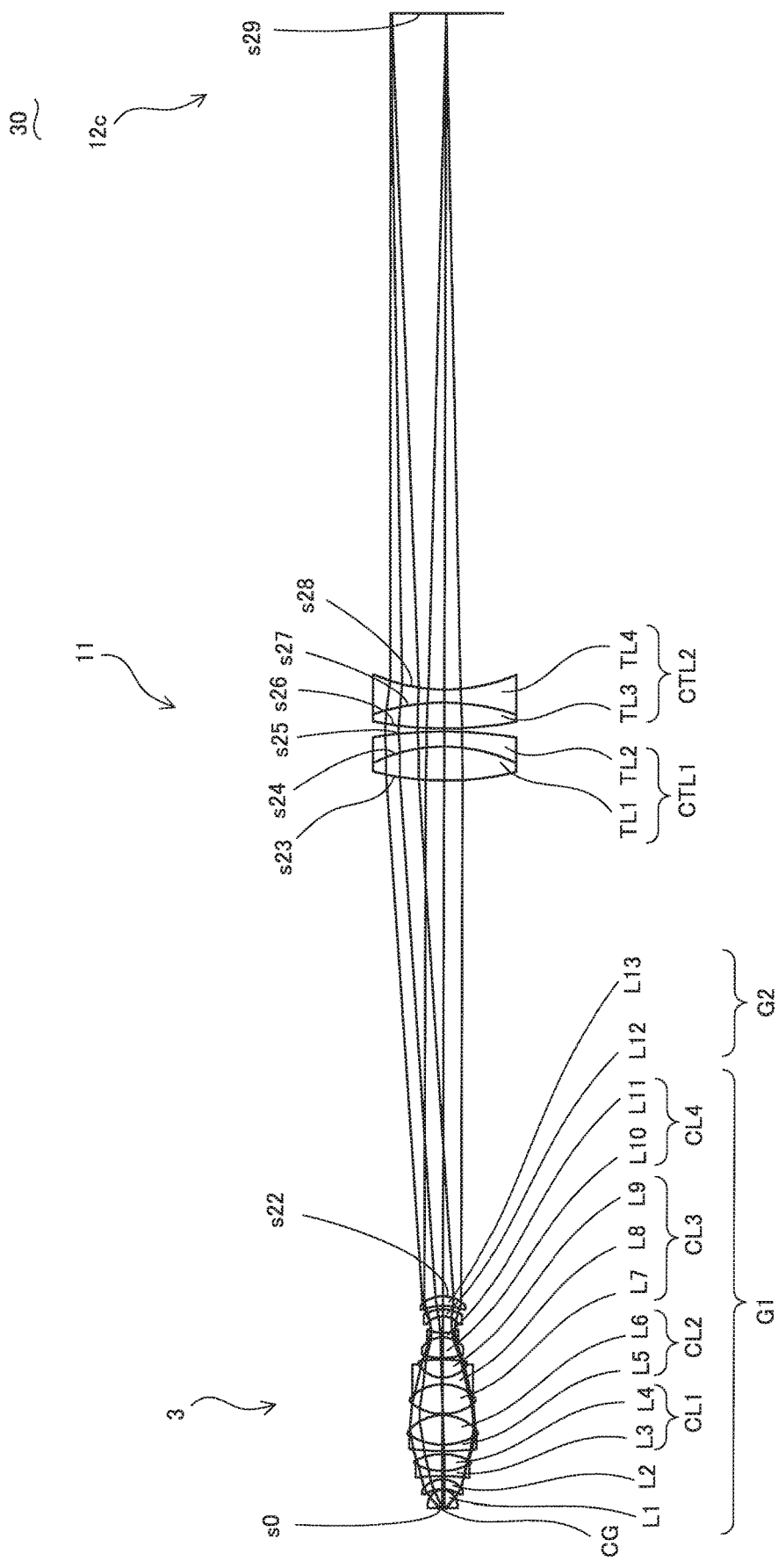
FIG. 8 is a cross-sectional view of an imaging optical system 30.
Figure 9:
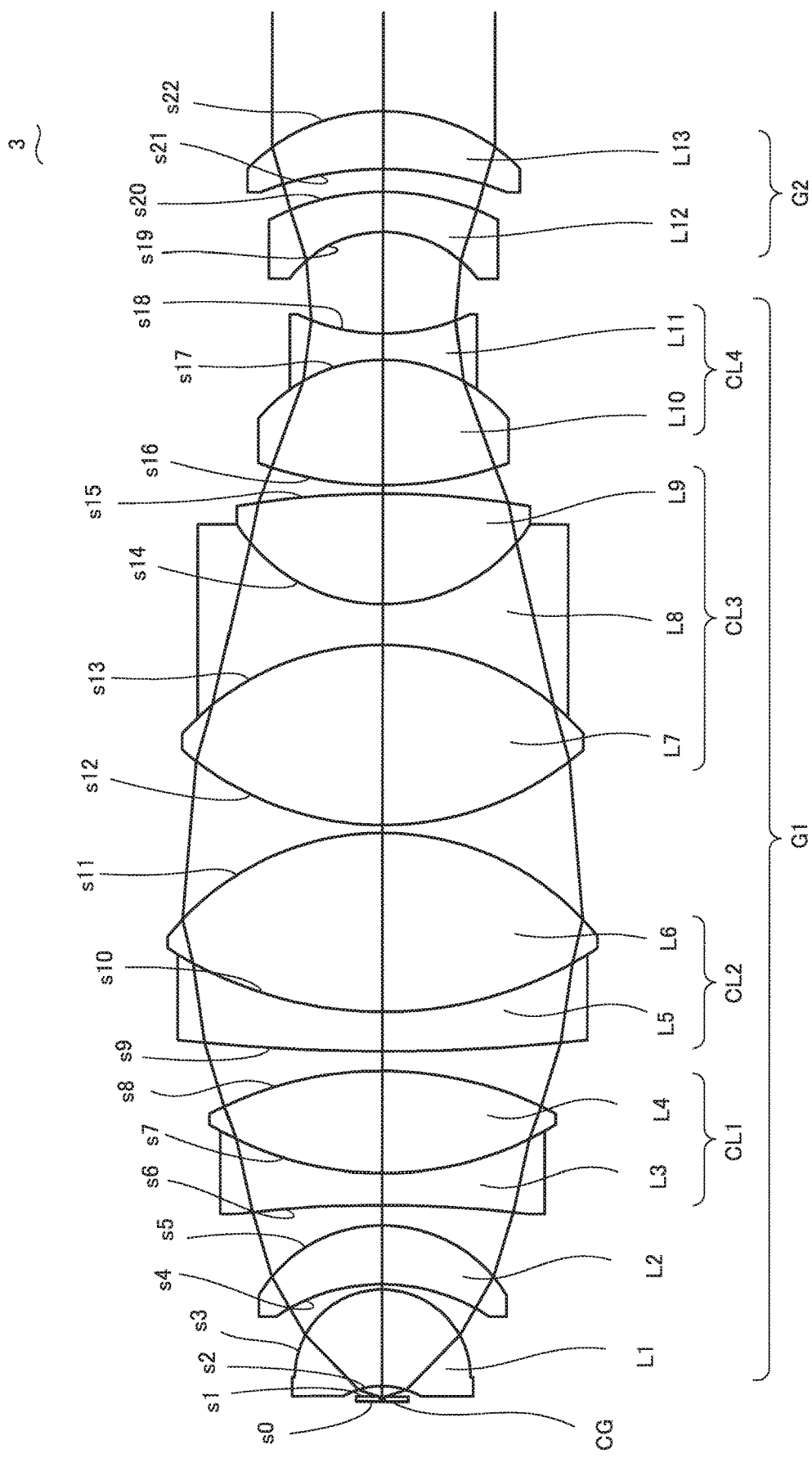
FIG. 9 is a cross-sectional view of an objective 3.

FIG. 8 is a cross-sectional view of an imaging optical system 30 in accordance with the present embodiment. FIG. 9 is a cross-sectional view of an objective 3 in accordance with this embodiment. As depicted in FIG. 8, the imaging optical system 30 includes the objective 3, an image-formation optical system 11, and an image sensor 12$c$, wherein an object, the objective 3, the image-formation optical system 11, and the image sensor 12$c$ are arranged in this order. The image-formation optical system 11 in the present embodiment is similar to that in the first embodiment.

As depicted in FIG. 9, the objective 3 includes: a first lens group G1 that includes a meniscus lens component that is the closest to an image among the lens components of the first lens group G1, the meniscus lens component having a convex surface facing the object; and a second lens group G2 that is closer to the image than the first lens group G1 is. The objective 3 is a dry microscope objective.

The first lens group G1 includes a lens L1 that is a meniscus lens having a concave surface facing the object, a lens L2 that is a meniscus lens having a concave surface facing the object, a cemented lens CL1, a cemented lens CL2, a cemented lens CL3, and a cemented lens CL4, wherein the object, the lens L1, the lens L2, the cemented lens CL1, the cemented lens CL2, the cemented lens CL3, and the cemented lens CL4 are arranged in this order. The cemented lens CL1 is a movable lens component that can be moved along an optical axis.

The lens L1 is a first lens component of the objective 3. The cemented lens CL1 is a cemented doublet lens and consists of a lens L3 that is a biconcave lens and a lens L4 that is a biconvex lens, wherein the object, the lens L3, and the lens L4 are arranged in this order. The cemented lens CL2 is a cemented doublet lens and consists of a lens L5 that is a meniscus lens having a concave surface facing the image and a lens L6 that is a biconvex lens, wherein the object, the lens L5, and the lens L6 are arranged in this order. The cemented lens CL3 is a cemented triplet lens and consists of a lens L7 that is a biconvex lens, a lens L8 that is a biconcave lens, and a lens L9 that is a biconvex lens, wherein the object, the lens L7, the lens L8, and the lens L9 are arranged in this order. The cemented lens CL4 is a cemented doublet lens and consists of a lens L10 that is a biconvex lens and a lens L11 that is a biconcave lens, wherein the object, the lens L10, and the lens L11 are arranged in this order. The cemented lens CL4 is a meniscus lens component having a convex surface facing the object.

The second lens group G2 includes a lens L12 that is a meniscus lens having a concave surface facing the object and a lens L13 that is a meniscus lens having a concave surface facing the object, wherein the object, the lens L12, and the lens L13 are arranged in this order. The lens L12 is a second-group first lens component of the objective 3.

The following are various data on the imaging optical system 30, where $\Phi_1$ indicates the outer diameter of the biconcave lens L11, i.e., the lens that is the closest to the image among the lenses constituting the cemented lens CL4, wherein the cemented lens CL4 is the meniscus lens component that is the closest to the image among the lens components of the first lens group G1.

$NA_{ob}=0.945$, $NA_i=0.024$, $|\beta|=40$, $f_{ob}=4.500$ mm, $f_{TL}=180$ mm, $f_{G1}=2.688$ mm, $f_{G2}=64.133$ mm, $f_1=10.117$ mm, $n_1=1.77621$, $h_1=2.942$ mm, $h_2=3.562$ mm, $t_1=1.541$ mm, $D=26$ mm, $s=0.028$ mm, $\Phi_1=7$ mm, $PX_n \leq 6.5 \times 10^6$, $PX_i=5.8 \times 10^6$ Various data on the image sensor 12$c$ included in the imaging optical system 30 are as follows.

$S_H$=20 0.8 mm, $S_V$=15.6 mm, $S_D$=26.0 mm, $N_H$=2970, $N_V$=2230, $N_D$=6.6×10⁶, P=7 μm

Lens data of the imaging optical system 30 are as follows.

| Imaging optical system 30 | | | | |
|---|---|---|---|---|
| s | r | d | ne | vd |
| 0 | INF | t | 1.52626 | 54.41 |
| 1 | INF | D1 | | |
| 2 | −3.0339 | 3.681 | 1.77621 | 49.6 |
| 3 | −3.3487 | 0.200 | | |
| 4 | −7.2937 | 2.241 | 1.57098 | 71.3 |
| 5 | −5.5255 | D5 | | |
| 6 | −45.764 | 1.200 | 1.64132 | 42.41 |
| 7 | 12.7782 | 3.875 | 1.43986 | 94.66 |
| 8 | −14.198 | D8 | | |
| 9 | 71.1197 | 1.500 | 1.61664 | 44.49 |
| 10 | 15.0477 | 6.788 | 1.43986 | 94.66 |
| 11 | −10.4578 | 0.300 | | |
| 12 | 11.6236 | 6.847 | 1.43986 | 94.66 |
| 13 | −10.3782 | 1.550 | 1.48915 | 70.23 |
| 14 | 6.6859 | 4.219 | 1.43986 | 94.66 |
| 15 | −32.513 | 0.300 | | |
| 16 | 13.9497 | 4.787 | 1.49846 | 81.54 |
| 17 | −6.1667 | 1.000 | 1.88815 | 40.76 |
| 18 | 7.744 | 3.857 | | |
| 19 | −4.5391 | 1.541 | 1.51825 | 64.14 |
| 20 | −9.3597 | 0.873 | | |
| 21 | −12.8369 | 2.219 | 1.7434 | 32.33 |
| 22 | −7.2219 | 119.000 | | |
| 23 | 68.7541 | 7.732 | 1.48915 | 70.21 |
| 24 | −37.5679 | 3.474 | 1.81077 | 40.95 |
| 25 | −102.8477 | 0.697 | | |
| 26 | 84.3099 | 6.024 | 1.83932 | 37.17 |
| 27 | −50.71 | 3.030 | 1.64825 | 40.82 |
| 28 | 40.6619 | 156.927 | | |
| 29 | INF | | | |

Surface numbers s0 and s1 respectively indicate an object surface (surface of cover glass CG on an object side) and a surface of the cover glass CG on an image side. Surface numbers s2 and s22 respectively indicate a lens surface that is the closest to an object among the lens surfaces of the objective 3 and a lens surface that is the closest to an image among the lens surfaces of the objective 3. Surface numbers s23 and s28 respectively indicate a lens surface that is the closest to the object among the lens surfaces of the image-formation optical system 11 and a lens surface that is the closest to the image among the lens surfaces of the image-formation optical system 11. Surface number s29 indicates the imaging plane of the image sensor 12c.

Surface interval t, i.e., the interval between the surface identified as surface number s0 and the surface identified as surface number s1, indicates the thickness of cover glass CG and is a variable amount varied according to cover glass CG. Surface interval D1, i.e., the interval between the surface identified as surface number s1 and the surface identified as surface number s2, indicates an air interval between cover glass CG and the objective 3 and is a variable amount varied according to cover glass CG. Each of surface interval D5, i.e., the interval between the surface identified as surface number s5 and the surface identified as surface number s6, and surface interval D8, i.e., the interval between the surface identified as surface number s8 and the surface identified as surface number s9, indicates an airspace between the movable lens component and a lens component adjacent thereto and is a variable amount varied according to the position of the movable lens component. The position of the movable lens component is adjusted according to, for example, the thickness of cover glass CG.

Relationships between the variable amounts are as follows:

| t (cover glass thickness) | 0.17 | 0.11 | 0.23 |
|---|---|---|---|
| D1 | 0.411 | 0.441 | 0.382 |
| D5 | 0.766 | 1.178 | 0.330 |
| D8 | 0.742 | 0.330 | 1.178 |

As indicated in the following, the imaging optical system 30 satisfies conditional expressions (1)-(9), excluding conditional expressions (5) and (6).

$$PX_n \leq 6.5 \times 10^6 \qquad (1)$$

$$D/\varepsilon = 992 \qquad (2)$$

$$n_1 = 1.77621 \qquad (3)$$

$$NA_{ob} = 0.945 \qquad (4), (5), (8)$$

$$f_{ob}/f_1 = 0.445 \qquad (6)$$

$$(h_2 - h_1)/t_1 = 0.40 \qquad (7)$$

$$PX_i = 5.8 \times 10^6 \qquad (9)$$

FIGS. 10A-10D are each an aberration diagram for the imaging optical system 30 depicted in FIG. 8 and indicate aberrations that occur on the image plane of the image sensor 12c. FIG. 10A is a spherical aberration diagram. FIG. 10B illustrates a sine-condition violation amount. FIG. 10C is an astigmatism diagram. FIG. 10D is a coma aberration diagram for a position with an image height ratio of 0.6 (image height 7.80 mm).

Fourth Embodiment

Figure 11:
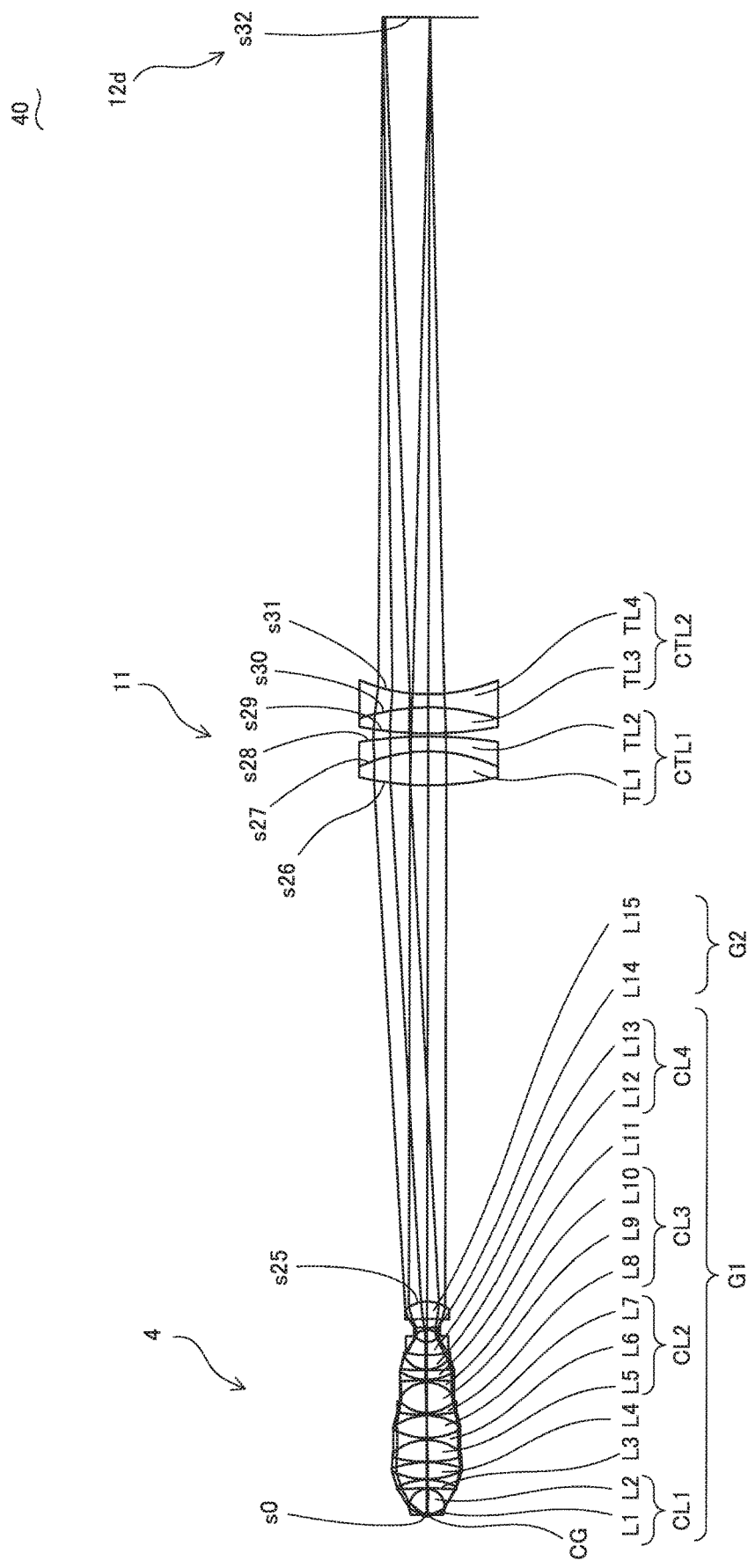
FIG. 11 is a cross-sectional view of an imaging optical system 40.
Figure 12:
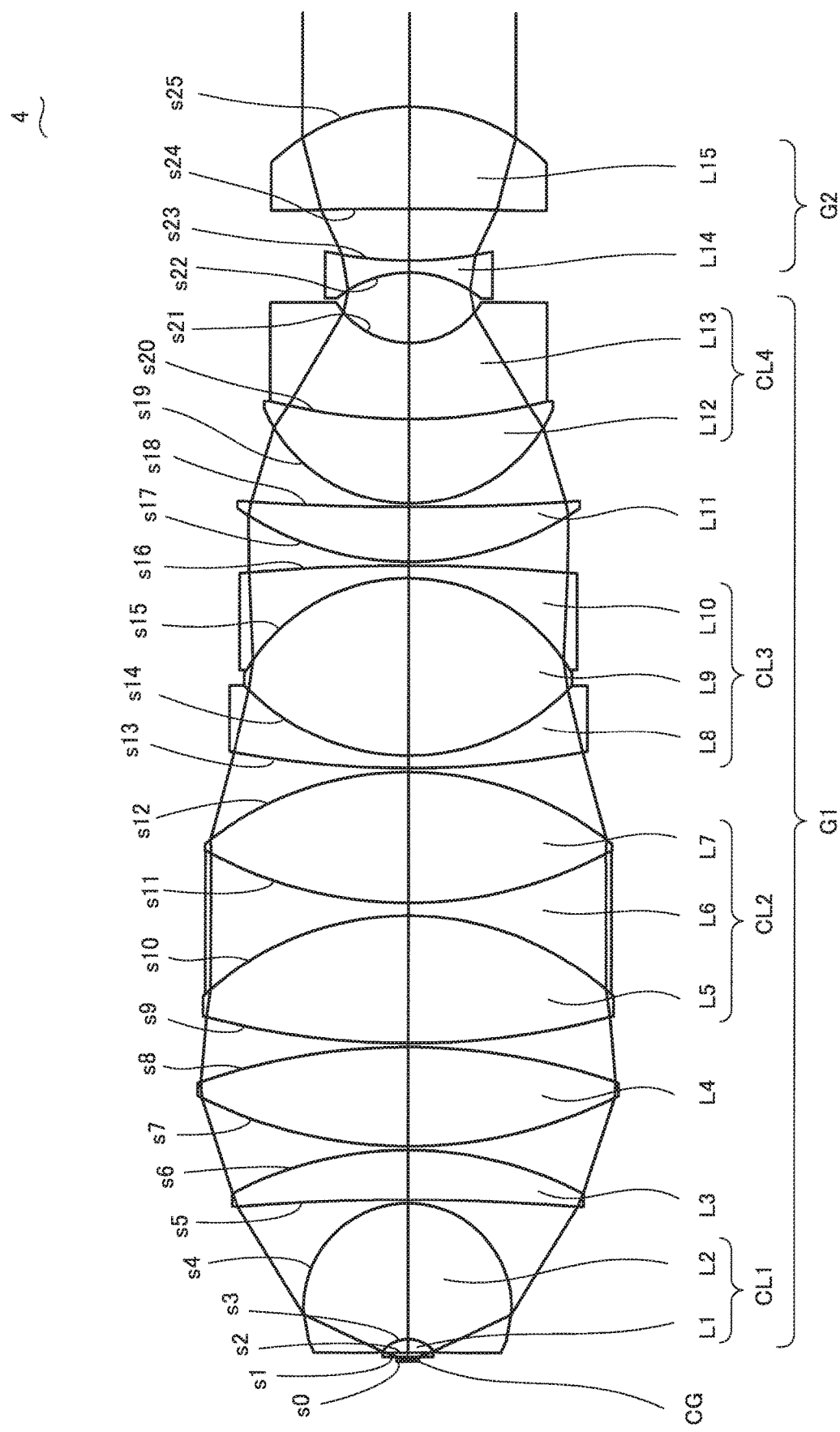
FIG. 12 is a cross-sectional view of an objective 4.

FIG. 11 is a cross-sectional view of an imaging optical system 40 in accordance with the present embodiment. FIG. 12 is a cross-sectional view of an objective 4 in accordance with this embodiment. As depicted in FIG. 11, the imaging optical system 40 includes the objective 4, an image-formation optical system 11, and an image sensor 12d, wherein an object, the objective 4, the image-formation optical system 11, and the image sensor 12d are arranged in this order. The image-formation optical system 11 in the present embodiment is similar to that in the first embodiment.

As depicted in FIG. 12, the objective 4 includes: a first lens group G1 that includes a meniscus lens component that is the closest to an image among the lens components of the first lens group G1, the meniscus lens component having a convex surface facing the object; and a second lens group G2 that is closer to the image than the first lens group G1 is. The objective 4 is an immersion microscope objective.

The first lens group G1 includes a cemented lens CL1, a lens L3 that is a meniscus lens having a concave surface facing the object, a lens L4 that is a biconvex lens, a cemented lens CL2, a cemented lens CL3, a lens L11 that is a meniscus lens having a concave surface facing the image, and a cemented lens CL4, wherein the object, the cemented lens CL1, the lens L3, the lens L4, the cemented lens CL2, the cemented lens CL3, the lens L11, and the cemented lens CL4 are arranged in this order.

The cemented lens CL1 is a first lens component of the objective 4. The cemented lens CL1 is a cemented doublet lens and consists of a lens L1 that is a planoconvex lens having a plane surface facing the object and a lens L2 that is a meniscus lens having a concave surface facing the object, wherein the object, the lens L1, and the lens L2 are arranged in this order. The cemented lens CL2 is a cemented triplet lens and consists of a lens L5 that is a biconvex lens, a lens L6 that is a biconcave lens, and a lens L7 that is a biconvex lens, wherein the object, the lens L5, the lens L6, and the lens L7 are arranged in this order. The cemented lens CL3 is a cemented triplet lens and consists of a lens L8 that is a meniscus lens having a concave surface facing the image, a lens L9 that is a biconvex lens, and a lens L10 that is a meniscus lens having a concave surface facing the object, wherein the object, the lens L8, the lens L9, and the lens L10 are arranged in this order. The cemented lens CL4 is a cemented doublet lens and consists of a lens L12 that is a meniscus lens having a concave surface facing the image and a lens L13 that is a meniscus lens having a concave surface facing the image, wherein the object, the lens L12, and the lens L13 are arranged in this order. The cemented lens CL4 is a meniscus lens component having a convex surface facing the object.

The second lens group G2 includes a lens L14 that is a biconcave lens and a lens L15 that is a meniscus lens having a concave surface facing the object, wherein the object, the lens L14, and the lens L15 are arranged in this order. The lens L14 is a second-group first lens component of the objective 4.

The following are various data on the imaging optical system 40, where $\Phi_1$ indicates the outer diameter of the meniscus lens L13, i.e., the lens that is the closest to the image among the lenses constituting the cemented lens CL4, wherein the cemented lens CL4 is the meniscus lens component that is the closest to the image among the lens components of the first lens group G1.

$NA_{ob}$=1.410, $NA_1$=0.023, $|\beta|$=60, $f_{ob}$=2.999 mm, $f_{TL}$=180 mm, $f_{G1}$=2.511 mm, $f_{G2}$=−27.949 mm, $f_1$=9.544 mm, $n_1$=1.83945, $h_1$=2.409 mm, $h_2$=2.639 mm, $t_1$=0.5 mm, D=22 mm, ε=0.028 mm, $\Phi_1$=11.5 mm, $PX_n$≤5.5×10$^6$, $PX_i$=5.5×10$^6$ Various data on the image sensor 12d included in the imaging optical system 40 are as follows.

$S_H$=20.8 mm, $S_V$=15.6 mm, $S_D$=22.0 mm, $N_H$=2708, $N_V$=2030, $N_D$=5.5×10$^6$, P=6.5 μm

Lens data of the imaging optical system 40 are as follows.

Imaging optical system 40

| s | r | d | ne | vd |
|---|---|---|---|---|
| 0 | INF | 0.17 | 1.52626 | 54.41 |
| 1 | INF | 0.18 | 1.51793 | 41 |
| 2 | INF | 0.540 | 1.51825 | 64.14 |
| 3 | −1.319 | 5.348 | 1.83945 | 42.73 |
| 4 | −4.1166 | 0.150 | | |
| 5 | −78.3319 | 1.963 | 1.57098 | 71.3 |
| 6 | −14.9285 | 0.150 | | |
| 7 | 18.406 | 3.895 | 1.43986 | 94.66 |
| 8 | −25.3193 | 0.150 | | |
| 9 | 31.1937 | 5.046 | 1.43986 | 94.66 |
| 10 | −11.9163 | 0.500 | 1.64132 | 42.41 |
| 11 | 16.5897 | 5.162 | 1.43986 | 94.66 |
| 12 | −12.8588 | 0.150 | | |
| 13 | 38.1374 | 0.500 | 1.64132 | 42.41 |
| 14 | 8.9209 | 7.020 | 1.43986 | 94.66 |
| 15 | −7.4439 | 0.500 | 1.61664 | 44.49 |
| 16 | −71.7589 | 0.150 | | |
| 17 | 11.8705 | 2.165 | 1.57098 | 71.3 |
| 18 | 96.6908 | 0.150 | | |
| 19 | 6.2225 | 3.339 | 1.57098 | 71.3 |
| 20 | 21.2446 | 3.016 | 1.83945 | 42.73 |
| 21 | 3.3871 | 2.7792 | | |
| 22 | −4.4975 | 0.5 | 1.77621 | 49.6 |

-continued

Imaging optical system 40

| s | r | d | ne | vd |
|---|---|---|---|---|
| 23 | 15.9215 | 2.0396 | | |
| 24 | −160.5239 | 4.056 | 1.74341 | 32.26 |
| 25 | −7.7872 | 119.000 | | |
| 26 | 68.7541 | 7.732 | 1.48915 | 70.21 |
| 27 | −37.5679 | 3.474 | 1.81077 | 40.95 |
| 28 | −102.8477 | 0.697 | | |
| 29 | 84.3099 | 6.024 | 1.83932 | 37.17 |
| 30 | −50.71 | 3.030 | 1.64825 | 40.82 |
| 31 | 40.6619 | 156.927 | | |
| 32 | INF | | | |

Surface numbers s0 and s1 respectively indicate an object surface (surface of cover glass CG on an object side) and a surface of the cover glass CG on an image side. Surface numbers s2 and s25 respectively indicate a lens surface that is the closest to an object among the lens surfaces of the objective 4 and a lens surface that is the closest to an image among the lens surfaces of the objective 4. Surface numbers s26 and s31 respectively indicate a lens surface that is the closest to the object among the lens surfaces of the image-formation optical system 11 and a lens surface that is the closest to the image among the lens surfaces of the image-formation optical system 11. Surface number s32 indicates the imaging plane of the image sensor 12d.

As indicated in the following, the imaging optical system 40 satisfies conditional expressions (1)-(9).

$$PX_n \leq 5.5 \times 10^6 \quad (1)$$

$$D/\varepsilon = 776 \quad (2)$$

$$n_1 = 1.83945 \quad (3)$$

$$NA_{ob} = 1.410 \quad (4), (5), (8)$$

$$f_{ob}/f_1 = 0.314 \quad (6)$$

$$(h_2-h_1)/t_1 = 0.46 \quad (7)$$

$$PX_i = 5.5 \times 10^6 \quad (9)$$

Figure 13:
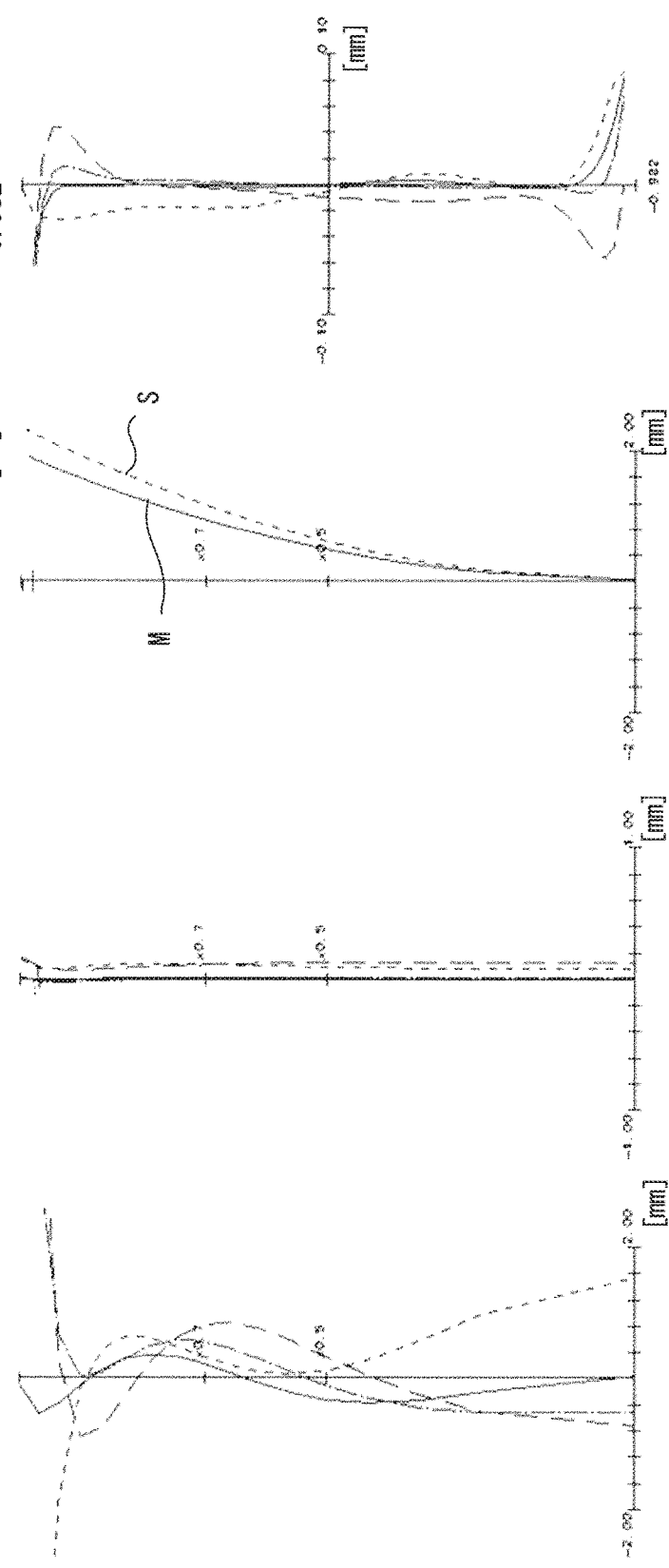
FIGS. 13A-13D are each an aberration diagram for an imaging optical system 40.

FIGS. 13A-13D are each an aberration diagram for the imaging optical system 40 depicted in FIG. 11 and indicate aberrations that occur on the image plane of the image sensor 12d. FIG. 13A is a spherical aberration diagram. FIG. 13B illustrates a sine-condition violation amount. FIG. 13C is an astigmatism diagram. FIG. 13D is a coma aberration diagram for a position with an image height ratio of 0.6 (image height 6.60 mm).

Fifth Embodiment

Figure 14:
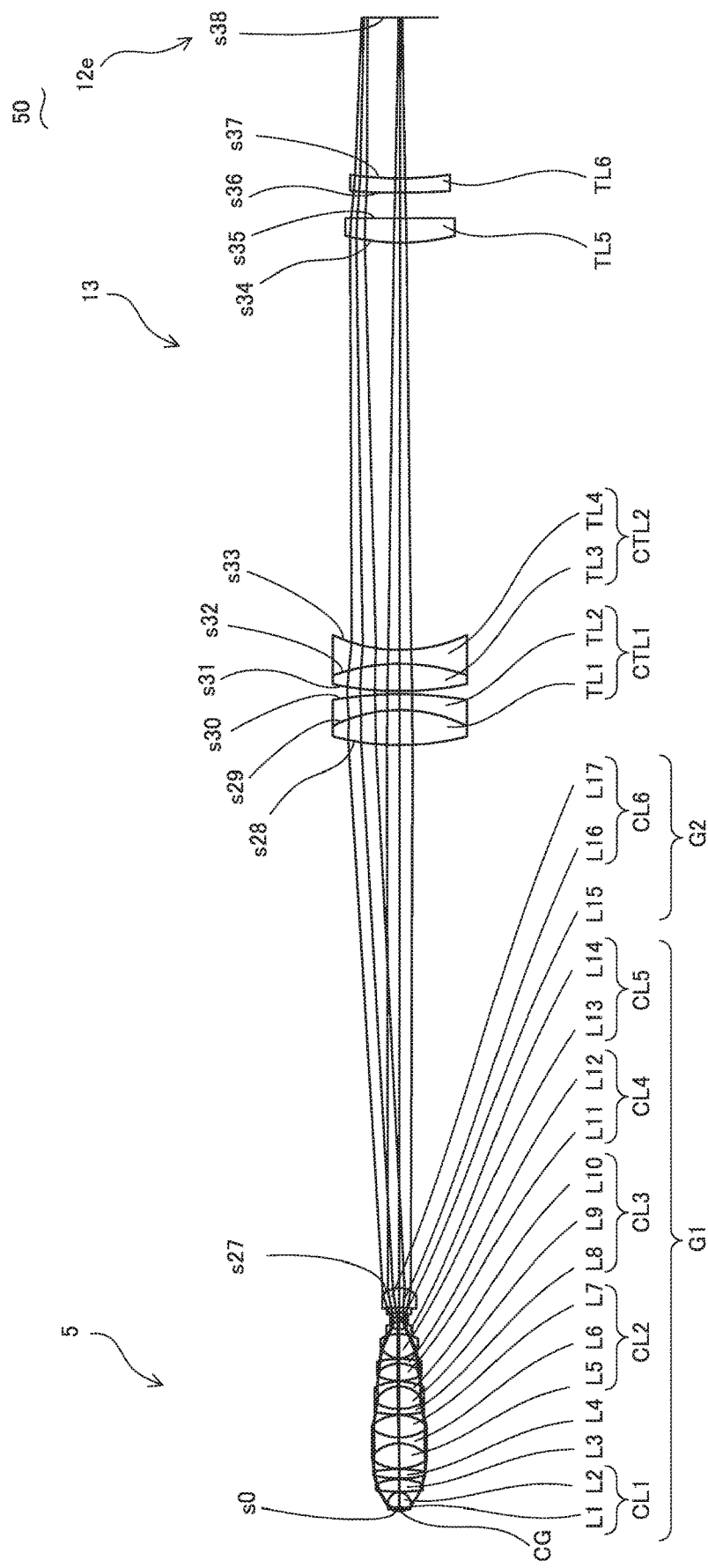
FIG. 14 is a cross-sectional view of an imaging optical system 50.
Figure 15:
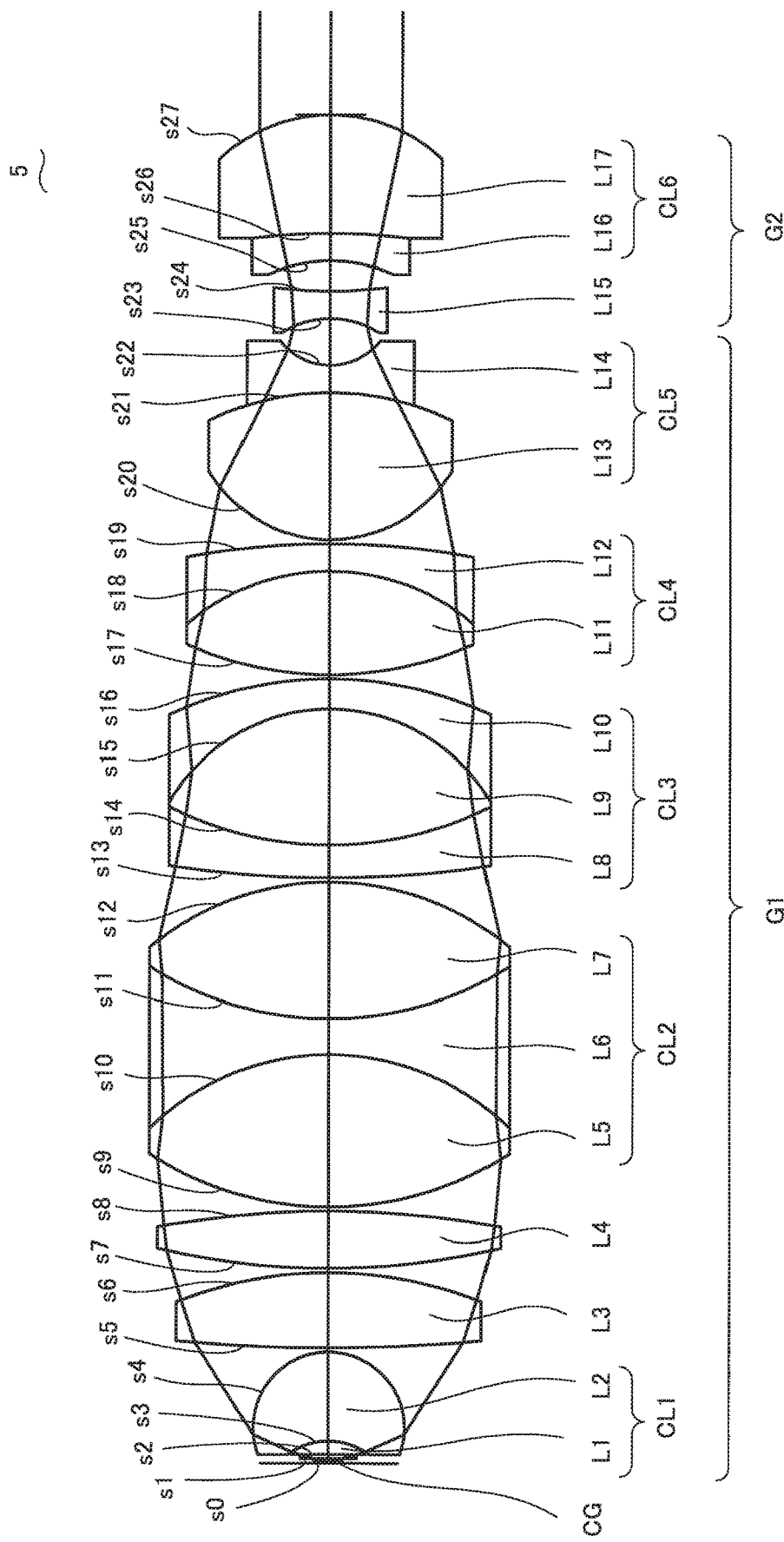
FIG. 15 is a cross-sectional view of an objective 5.

FIG. 14 is a cross-sectional view of an imaging optical system 50 in accordance with the present embodiment. FIG. 15 is a cross-sectional view of an objective 5 in accordance with this embodiment. As depicted in FIG. 14, the imaging optical system 50 includes the objective 5, an image-formation optical system 13, and an image sensor 12e, wherein an object, the objective 5, the image-formation optical system 13, and the image sensor 12e are arranged in this order.

As depicted in FIG. 15, the objective 5 includes: a first lens group G1 that includes a meniscus lens component that is the closest to an image among the lens components of the first lens group G1, the meniscus lens component having a convex surface facing the object; and a second lens group G2 that is closer to the image than the first lens group G1 is. The objective 5 is an immersion microscope objective.

The first lens group G1 includes a cemented lens CL1, a lens L3 that is a biconvex lens, a lens L4 that is a biconvex lens, a cemented lens CL2, a cemented lens CL3, a cemented lens CL4, and a cemented lens CL5, wherein the object, the cemented lens CL1, the lens L3, the lens L4, the cemented lens CL2, the cemented lens CL3, the cemented lens CL4, and the cemented lens CL5 are arranged in this order.

The cemented lens CL1 is a first lens component of the objective 5. The cemented lens CL1 is a cemented doublet lens and consists of a lens L1 that is a planoconvex lens having a plane surface facing the object and a lens L2 that is a meniscus lens having a concave surface facing the object, wherein the object, the lens L1, and the lens L2 are arranged in this order. The cemented lens CL2 is a cemented triplet lens and consists of a lens L5 that is a biconvex lens, a lens L6 that is a biconcave lens, and a lens L7 that is a biconvex lens, wherein the object, the lens L5, the lens L6, and the lens L7 are arranged in this order. The cemented lens CL3 is a cemented triplet lens and consists of a lens L8 that is a meniscus lens having a concave surface facing the image, a lens L9 that is a biconvex lens, and a lens L10 that is a meniscus lens having a concave surface facing the object, wherein the object, the lens L8, the lens L9, and the lens L10 are arranged in this order. The cemented lens CL4 is a cemented doublet lens and consists of a lens L11 that is a biconvex lens and a lens L12 that is a meniscus lens having a concave surface facing the object, wherein the object, the lens L11, and the lens L12 are arranged in this order. The cemented lens CL5 is a cemented doublet lens and consists of a lens L13 that is a biconvex lens and a lens L14 that is a biconcave lens, wherein the object, the lens L13, and the lens L14 are arranged in this order. The cemented lens CL5 is a meniscus lens component having a convex surface facing the object.

The second lens group G2 includes a lens L15 that is a biconcave lens and a cemented lens CL6, wherein the object, the lens L15, and the cemented lens CL6 are arranged in this order. The lens L15 is a second-group first lens component of the objective 5. The cemented lens CL6 is a cemented doublet lens and consists of a lens L16 that is a meniscus lens having a concave surface facing the object and a lens L17 that is a meniscus lens having a concave surface facing the object, wherein the object, the lens L16, and the lens L17 are arranged in this order.

As depicted in FIG. 14, the image-formation optical system 13 includes a cemented lens CTL1, a cemented lens CTL2, a lens TL5 that is a planoconvex lens having a plane surface facing the image, and a lens TL6 that is a meniscus lens having a concave surface facing the image, wherein the object, the cemented lens CTL1, the cemented lens CTL2, the lens TL5, and the lens TL6 are arranged in this order. The cemented lenses CTL1 and CTL2 in the present embodiment are similar to those of the image-formation optical system 11 in the first embodiment.

The following are various data on the imaging optical system 50, where $f_{TL}$ indicates the focal length of the image-formation optical system 13, and 01 indicates the outer diameter of the biconcave lens L14, i.e., the lens that is the closest to the image among the lenses constituting the cemented lens CL5, wherein the cemented lens CL5 is the meniscus lens component that is the closest to the image among the lens components of the first lens group G1.

$NA_{ob}$=1.453, $NA_i$=0.019, $|\beta|$=75, $f_{ob}$=1.800 mm, $f_{TL}$=135 mm, $f_{G1}$=2.048 mm, $f_{G2}$=−12.116 mm, $f_1$=4.191 mm, $n_1$=1.80811, $h_1$=1.341 mm, $h_2$=1.429 mm, $t_1$=1 mm, D=17.5 mm, ε=0.034 mm, $\Phi_1$=7 mm, $PX_n$≤5.9×10$^6$, $PX_i$=5.9×10$^6$ The following are various data on the image sensor 12e included in the imaging optical system 50.

$S_H$=14.0 mm, $S_V$=10.5 mm, $S_D$=17.5 mm, $N_H$=2800, $N_V$=2100, $N_D$=5.9×10$^6$, P=5 μm

Lens data of the imaging optical system 50 are as follows.

| Imaging optical system 50 | | | | |
|---|---|---|---|---|
| s | r | d | ne | vd |
| 0 | INF | 0.17 | 1.52626 | 54.41 |
| 1 | INF | 0.15 | 1.51793 | 41.00 |
| 2 | INF | 0.490 | 1.51825 | 64.14 |
| 3 | −2.5256 | 3.245 | 1.80811 | 46.53 |
| 4 | −2.758 | 0.150 | | |
| 5 | 57.0411 | 2.739 | 1.57098 | 71.30 |
| 6 | −15.1633 | 0.150 | | |
| 7 | 26.7162 | 2.064 | 1.43986 | 94.66 |
| 8 | −34.6539 | 0.150 | | |
| 9 | 12.0693 | 5.530 | 1.43986 | 94.66 |
| 10 | −9.3615 | 1.300 | 1.64132 | 42.41 |
| 11 | 12.289 | 4.960 | 1.43986 | 94.66 |
| 12 | −10.2507 | 0.150 | | |
| 13 | 38.3223 | 1.200 | 1.75844 | 52.32 |
| 14 | 12.9929 | 4.935 | 1.43986 | 94.66 |
| 15 | −6.7513 | 1.100 | 1.75844 | 52.32 |
| 16 | −13.8019 | 0.150 | | |
| 17 | 12.8304 | 3.778 | 1.43986 | 94.66 |
| 18 | −8.0374 | 1.000 | 1.75844 | 52.32 |
| 19 | −28.8995 | 0.150 | | |
| 20 | 5.1902 | 5.3476 | 1.57098 | 71.30 |
| 21 | −10.1104 | 1 | 1.64132 | 42.41 |
| 22 | 2.3315 | 1.7 | | |
| 23 | −3.3075 | 1 | 1.75844 | 52.32 |
| 24 | 16.1481 | 1.1 | | |
| 25 | −5.4713 | 1 | 1.51825 | 64.14 |
| 26 | −22.079 | 4.3375 | 1.7434 | 32.33 |
| 27 | −5.8878 | 119 | | |
| 28 | 68.7541 | 7.732 | 1.48915 | 70.21 |
| 29 | −37.5679 | 3.474 | 1.81077 | 40.95 |
| 30 | −102.8477 | 0.697 | | |
| 31 | 84.3099 | 6.024 | 1.83932 | 37.17 |
| 32 | −50.71 | 3.030 | 1.64825 | 40.82 |
| 33 | 40.6619 | 89.682 | | |
| 34 | 55.4119 | 5.370 | 1.48915 | 70.23 |
| 35 | INF | 5.770 | | |
| 36 | 252.1187 | 3.120 | 1.67765 | 32.1 |
| 37 | 82.9177 | 36.659 | | |
| 38 | INF | | | |

Surface numbers s0 and s1 respectively indicate an object surface (surface of cover glass CG on an object side) and a surface of the cover glass CG on an image side. Surface numbers s2 and s27 respectively indicate a lens surface that is the closest to an object among the lens surfaces of the objective 5 and a lens surface that is the closest to an image among the lens surfaces of the objective 5. Surface numbers s28 and s37 respectively indicate a lens surface that is the closest to the object among the lens surfaces of the image-formation optical system 13 and a lens surface that is the closest to the image among the lens surfaces of the image-formation optical system 13. Surface number s38 indicates the imaging plane of the image sensor 12e.

As indicated in the following, the imaging optical system 50 satisfies conditional expressions (1)-(9), excluding conditional expression (7).

$$PX_n \le 5.9 \times 10^6 \tag{1}$$

$$D/\varepsilon = 509 \tag{2}$$

$$n_1 = 1.80811 \tag{3}$$

$$NA_{ob}=1.453 \quad (4), (5), (8)$$

$$f_{ob}/f_1=0.429 \quad (6)$$

$$(h_2-h_1)/t_1=0.09 \quad (7)$$

$$PX_i=5.9\times10^6 \quad (9)$$

Figure 16:
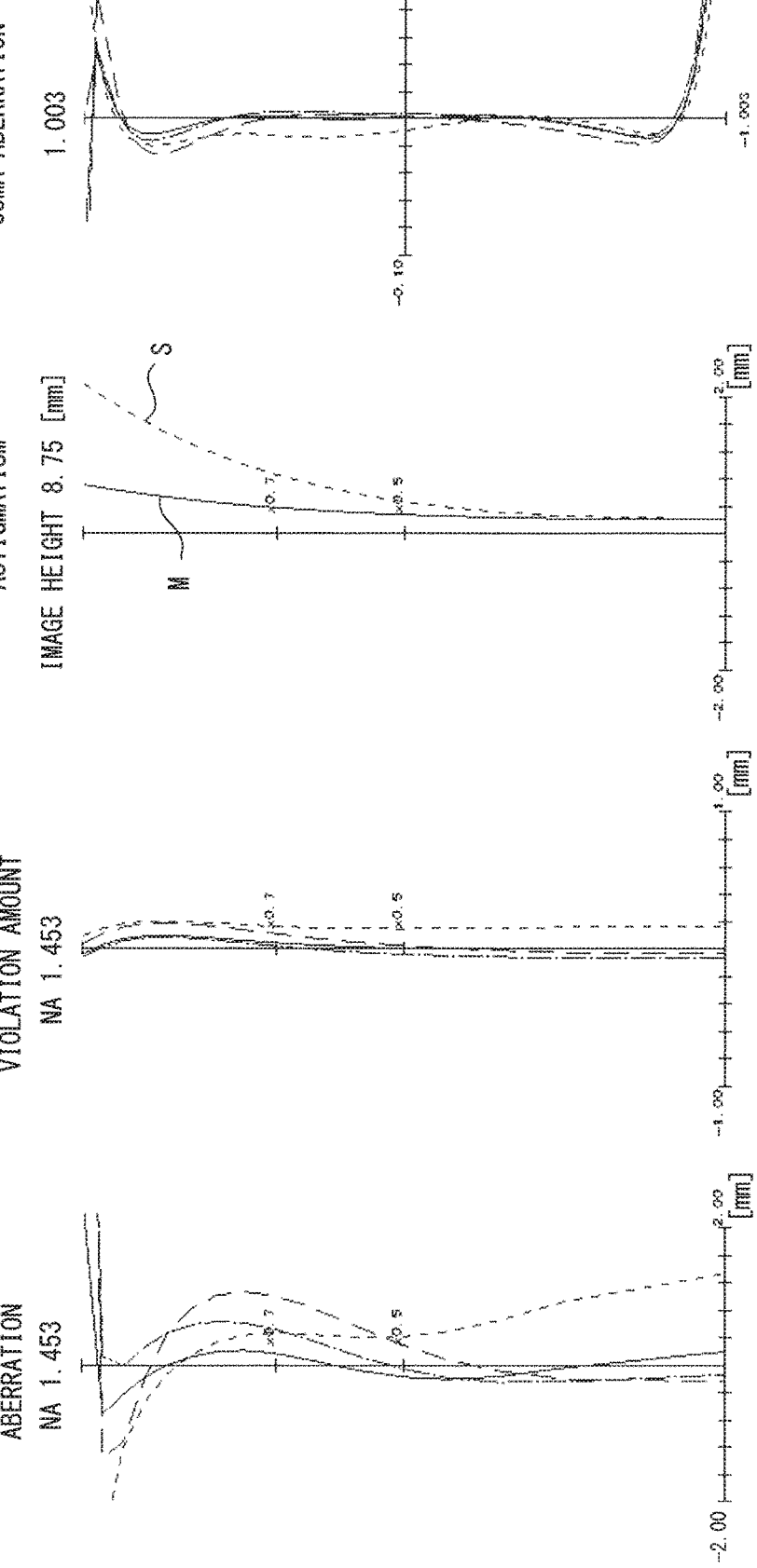
FIGS. 16A-16D are each an aberration diagram for an imaging optical system 50.

FIGS. 16A-16D are each an aberration diagram for the imaging optical system 50 depicted in FIG. 14 and indicate aberrations that occur on the image plane of the image sensor 12e. FIG. 16A is a spherical aberration diagram. FIG. 16B illustrates a sine-condition violation amount. FIG. 16C is an astigmatism diagram. FIG. 16D is a coma aberration diagram for a position with an image height ratio of 0.6 (image height 5.25 mm).

Sixth Embodiment

Figure 17:
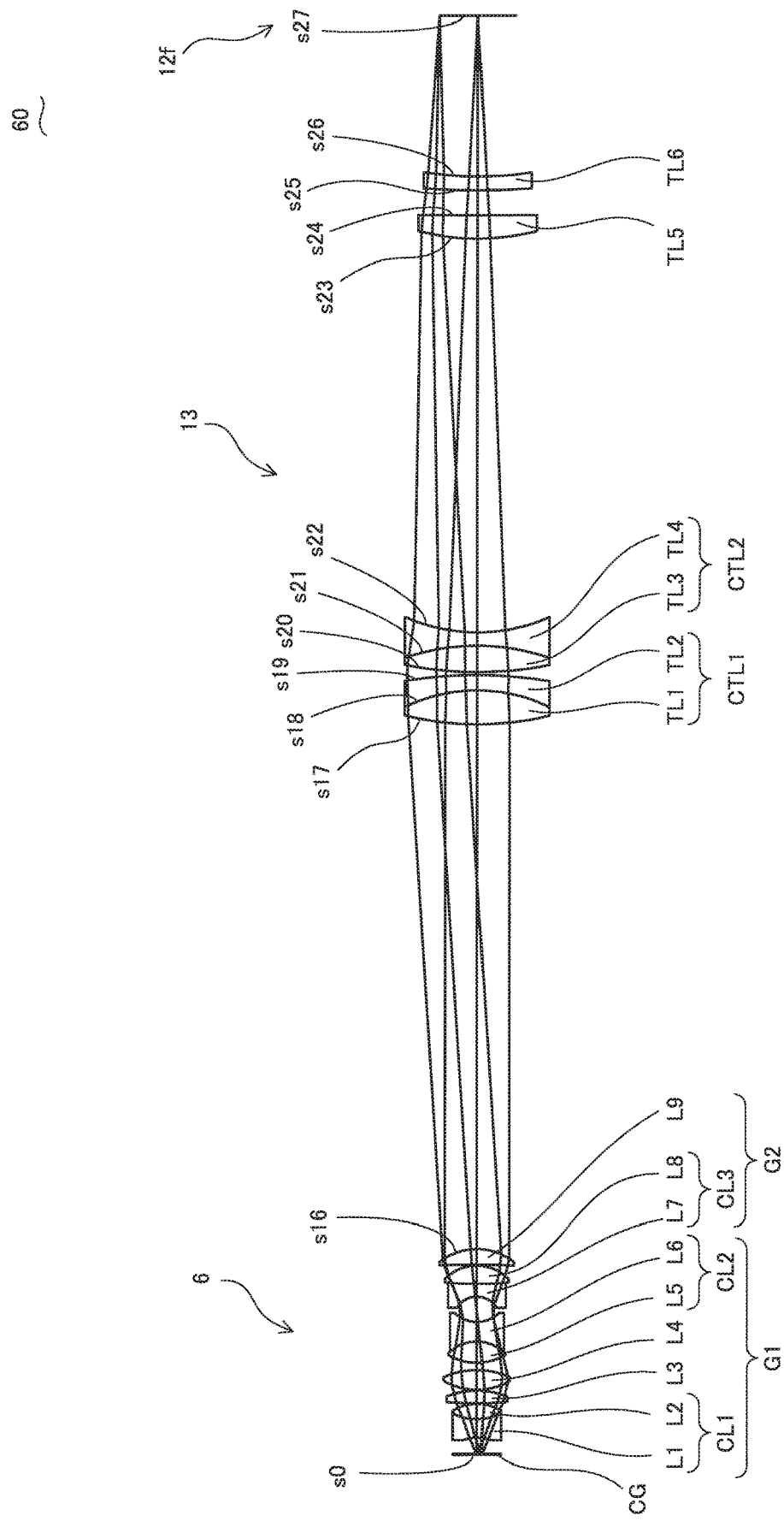
FIG. 17 is a cross-sectional view of an imaging optical system 60.
Figure 18:
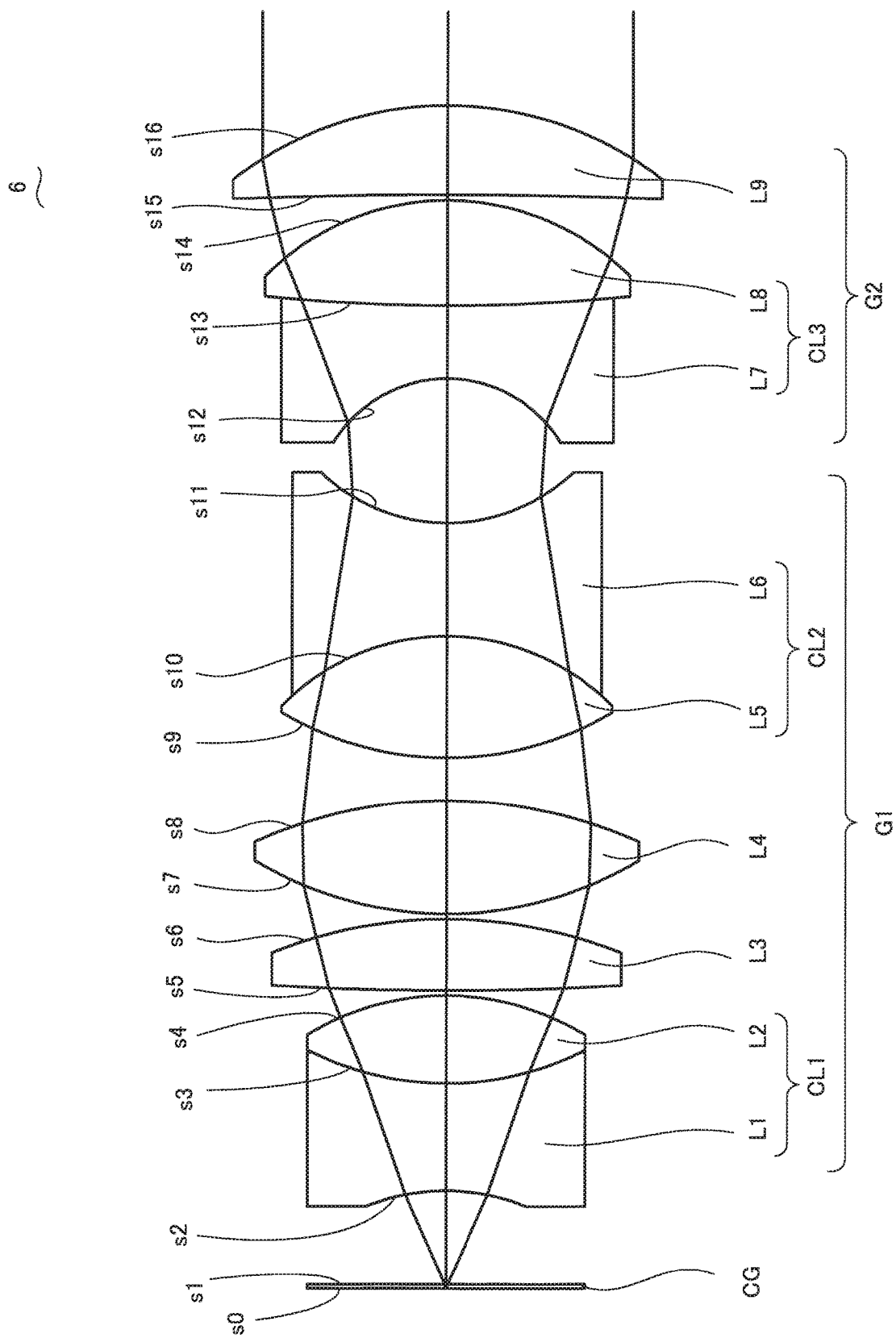
FIG. 18 is a cross-sectional view of an objective 6.

FIG. 17 is a cross-sectional view of an imaging optical system 60 in accordance with the present embodiment. FIG. 18 is a cross-sectional view of an objective 6 in accordance with this embodiment. As depicted in FIG. 17, the imaging optical system 60 includes the objective 6, an image-formation optical system 13, and an image sensor 12f, wherein an object, the objective 6, the image-formation optical system 13, and the image sensor 12f are arranged in this order. The image-formation optical system 13 in the present embodiment is similar to that in the fifth embodiment.

As depicted in FIG. 18, the objective 6 includes: a first lens group G1 that includes a meniscus lens component that is the closest to an image among the lens components of the first lens group G1, the meniscus lens component having a convex surface facing the object; and a second lens group G2 that is closer to the image than the first lens group G1 is. The objective 6 is a dry microscope objective.

The first lens group G1 includes a cemented lens CL1, a lens L3 that is a biconvex lens, a lens L4 that is a biconvex lens, and a cemented lens CL2, wherein the object, the cemented lens CL1, the lens L3, the lens L4, and the cemented lens CL2 are arranged in this order.

The cemented lens CL1 is a first lens component of the objective 6. The cemented lens CL1 is a cemented doublet lens and consists of a lens L1 that is a biconcave lens and a lens L2 that is a biconvex lens, wherein the object, the lens L1, and the lens L2 are arranged in this order. The cemented lens CL2 is a cemented doublet lens and consists of a lens L5 that is a biconvex lens and a lens L6 that is a biconcave lens, wherein the object, the lens L5, and the lens L6 are arranged in this order. The cemented lens CL2 is a meniscus lens component having a convex surface facing the object.

The second lens group G2 includes a cemented lens CL3 and a lens L9 that is a biconvex lens, wherein the object, the cemented lens CL3, and the lens L9 are arranged in this order. The cemented lens CL3 is a second-group first lens component of the objective 6. The cemented lens CL3 is a cemented doublet lens and consists of a lens L7 that is a biconcave lens and a lens L8 that is a biconvex lens, wherein the object, the lens L7, and the lens L8 are arranged in this order.

The following are various data on the imaging optical system 60, where $\Phi_1$ indicates the outer diameter of the biconcave lens L6, i.e., the lens that is the closest to the image among the lenses constituting the cemented lens CL2, wherein the cemented lens CL2 is the meniscus lens component that is the closest to the image among the lens components of the first lens group G1.

$NA_{ob}=0.400$, $NA_i=0.053$, $|\beta|=8$, $f_{ob}=18.000$ mm, $f_{TL}=135$ mm, $f_{G1}=9.911$ mm, $f_{G2}=88.412$ mm, $f_1=-51.239$ mm, $n_1=1.61664$, $h_1=3.93$ mm, $h_2=6.448$ mm, $t_1=7.07$ mm, $D=17.5$ mm, $\varepsilon=0.012$ mm, $\Phi_1=12$ mm, $PX_n \leq 1.6\times10^7$, $PX_i=1.6\times10^7$ The following are various data on the image sensor 12f included in the imaging optical system 60.

$S_H=14.0$ mm, $S_V=10.5$ mm, $S_D=17.5$ mm, $N_H=4668$, $N_V=3500$, $N_D=1.63\times10^7$, $P=3$ μm Lens data of the imaging optical system 60 are as follows.

| Imaging optical system 60 | | | | |
|---|---|---|---|---|
| s | r | d | ne | vd |
| 0 | INF | 0.170 | 1.52626 | 54.41 |
| 1 | INF | 3.712 | | |
| 2 | −8.3986 | 4.221 | 1.61664 | 44.49 |
| 3 | 12.1766 | 3.480 | 1.49846 | 81.54 |
| 4 | −10.5755 | 0.200 | | |
| 5 | 125.8891 | 2.810 | 1.43986 | 94.66 |
| 6 | −18.6353 | 0.201 | | |
| 7 | 14.7946 | 4.481 | 1.43986 | 94.66 |
| 8 | −18.4565 | 1.687 | | |
| 9 | 12.8039 | 4.810 | 1.43986 | 94.66 |
| 10 | −9.1339 | 4.490 | 1.51825 | 64.14 |
| 11 | 7.2434 | 5.711 | | |
| 12 | −5.268 | 2.900 | 1.51825 | 64.14 |
| 13 | 70.4239 | 4.170 | 1.43986 | 94.66 |
| 14 | −10.1954 | 0.226 | | |
| 15 | 199.538 | 3.530 | 1.43986 | 94.66 |
| 16 | −13.7504 | 119 | | |
| 17 | 68.7541 | 7.732 | 1.48915 | 70.21 |
| 18 | −37.5679 | 3.474 | 1.81077 | 40.95 |
| 19 | −102.8477 | 0.697 | | |
| 20 | 84.3099 | 6.024 | 1.83932 | 37.17 |
| 21 | −50.71 | 3.030 | 1.64825 | 40.82 |
| 22 | 40.6619 | 89.682 | | |
| 23 | 55.4119 | 5.370 | 1.48915 | 70.23 |
| 24 | INF | 5.770 | | |
| 25 | 252.1187 | 3.120 | 1.67765 | 32.1 |
| 26 | 82.9177 | 36.659 | | |
| 27 | INF | | | |

Surface numbers s0 and s1 respectively indicate an object surface (surface of cover glass CG on an object side) and a surface of the cover glass CG on an image side. Surface numbers s2 and s16 respectively indicate a lens surface that is the closest to an object among the lens surfaces of the objective 6 and a lens surface that is the closest to an image among the lens surfaces of the objective 6. Surface numbers s17 and s26 respectively indicate a lens surface that is the closest to the object among the lens surfaces of the image-formation optical system 13 and a lens surface that is the closest to the image among the lens surfaces of the image-formation optical system 13. Surface number s27 indicates the imaging plane of the image sensor 12f.

As indicated in the following, the imaging optical system 60 satisfies conditional expressions (1)-(3) and (9).

$$PX_n \leq 1.6\times10^7 \quad (1)$$

$$D/\varepsilon=1401 \quad (2)$$

$$n_1=1.61664 \quad (3)$$

$$NA_{ob}=0.400 \quad (4), (5), (8)$$

$$f_{ob}/f_1=0.351 \quad (6)$$

$$(h_2-h_1)/t_1=0.36 \quad (7)$$

$$PX_i=1.6\times10^7 \quad (9)$$

FIGS. 19A-19D are each an aberration diagram for the imaging optical system 60 depicted in FIG. 17 and indicate aberrations that occur on the image plane of the image sensor 12f. FIG. 19A is a spherical aberration diagram. FIG. 19B illustrates a sine-condition violation amount. FIG. 19C is an astigmatism diagram. FIG. 19D is a coma aberration diagram for a position with an image height ratio of 0.6 (image height 5.25 mm).

What is claimed is:

1. An imaging optical system comprising:
an objective;
an image-formation optical system; and
an image sensor, wherein
an object, the objective, the image-formation optical system, and the image sensor are arranged in this order, the objective includes
a first lens group that includes a meniscus lens component that is closest to an image among lens components of the first lens group, the meniscus lens component having a convex surface facing the object, and
a second lens group that is closer to the image than the first lens group is,
the imaging optical system satisfies the following conditional expression:

$$4 \times 10^6 \leq PX_n \leq 1 \times 10^{10} \quad (1)$$

where $PX_n$ indicates a number of pixels included in a region on an imaging plane of the image sensor in which a Modulation Transfer Function specific to an e line is 40% or higher, the Modulation Transfer Function specific to the e line is a Modulation Transfer Function achieved at a spatial frequency of $750 \times NA_i$, and $NA_i$ indicates a numerical aperture of an image side of the imaging optical system.

2. The imaging optical system of claim 1, satisfying the following conditional expression:

$$400 \leq D/\varepsilon \leq 10000 \quad (2)$$

where D indicates a diagonal length of the image sensor, and $\varepsilon$ indicates an Airy disk diameter for the e line on the imaging plane and an optical axis.

3. The imaging optical system of claim 1, wherein:
the first lens group includes a first lens component that is closest to the object among the lens components of the first lens group and that has a convex surface facing the image, and
the imaging optical system satisfies the following conditional expression:

$$1.5 \leq n_1 \leq 1.85 \quad (3)$$

where $n_1$ indicates a highest of refractive indexes that lenses included in the first lens component have for the e line.

4. The imaging optical system of claim 2, wherein:
the first lens group includes a first lens component that is closest to the object among the lens components of the first lens group and that has a convex surface facing the image, and
the imaging optical system satisfies the following conditional expression:

$$1.5 \leq n_1 \leq 1.85 \quad (3)$$

where $n_1$ indicates a highest of refractive indexes that lenses included in the first lens component have for the e line.

5. The imaging optical system of claim 1, wherein the second lens group includes a plurality of lens components.

6. The imaging optical system of claim 2, wherein the second lens group includes a plurality of lens components.

7. The imaging optical system of claim 3, wherein the second lens group includes a plurality of lens components.

8. The imaging optical system of claim 4, wherein the second lens group includes a plurality of lens components.

9. The imaging optical system of claim 1, further comprising:
a cemented triplet lens,
wherein:
the imaging optical system satisfies the following conditional expression:

$$0.5 \leq NA_{ob} \quad (4)$$

where $NA_{ob}$ indicates a numerical aperture of an object side of the objective.

10. The imaging optical system of claim 2, further comprising:
a cemented triplet lens,
wherein:
the imaging optical system satisfies the following conditional expression:

$$0.5 \leq NA_{ob} \quad (4)$$

where $NA_{ob}$ indicates a numerical aperture of an object side of the objective.

11. The imaging optical system of claim 3, further comprising:
a cemented triplet lens,
wherein:
the imaging optical system satisfies the following conditional expression:

$$0.5 \leq NA_{ob} \quad (4)$$

where $NA_{ob}$ indicates a numerical aperture of an object side of the objective.

12. The imaging optical system of claim 4, further comprising:
a cemented triplet lens,
wherein:
the imaging optical system satisfies the following conditional expression:

$$0.5 \leq NA_{ob} \quad (4)$$

where $NA_{ob}$ indicates a numerical aperture of an object side of the objective.

13. The imaging optical system of claim 5, further comprising:
a cemented triplet lens,
wherein:
the imaging optical system satisfies the following conditional expression:

$$0.5 \leq NA_{ob} \quad (4)$$

where $NA_{ob}$ indicates a numerical aperture of an object side of the objective.

14. The imaging optical system of claim 6, further comprising:
a cemented triplet lens,
wherein:
the imaging optical system satisfies the following conditional expression:

$$0.5 \leq NA_{ob} \quad (4)$$

where $NA_{ob}$ indicates a numerical aperture of an object side of the objective.

15. The imaging optical system of claim 7, further comprising:
a cemented triplet lens,
wherein:
the imaging optical system satisfies the following conditional expression:

$$0.5 \leq NA_{ob} \quad (4)$$

where $NA_{ob}$ indicates a numerical aperture of an object side of the objective.

16. The imaging optical system of claim 9, wherein the cemented triplet lens consists of a negative lens and two positive lenses having the negative lens situated therebetween.

17. The imaging optical system of claim 3, wherein:
the objective is an immersion objective, and
the imaging optical system satisfies the following conditional expressions:

$$1 \leq NA_{ob} \quad (5)$$

$$-0.2 \leq f_{ob}/f_1 \leq 0.43 \quad (6)$$

where $NA_{ob}$ indicates a numerical aperture of an object side of the objective, $f_{ob}$ indicates a focal length that the objective has for the e line, and $f_1$ indicates a focal length that the first lens component has for the e line.

18. The imaging optical system of claim 1, wherein:
the second lens group includes a second-group first lens component that is closest to the object among lens components of the second lens group, and the imaging optical system satisfies the following conditional expression:

$$0.39 \leq (h_2 - h_1)/t_1 \leq 0.7 \quad (7)$$

where $h_1$ indicates a height of an axial marginal ray at a lens surface on an object side of the second-group first lens component, $h_2$ indicates a height of the axial marginal ray at a lens surface on an image side of the second-group first lens component, and $t_1$ indicates a thickness that the second-group first lens component has on an optical axis.

19. The imaging optical system of claim 1, wherein:
the objective is a dry objective,
the imaging optical system further comprises at least one lens component capable of being moved along an optical axis, and
the imaging optical system satisfies the following conditional expression:

$$0.85 \leq NA_{ob} < 1 \quad (8)$$

where $NA_{ob}$ indicates a numerical aperture of an object side of the objective.

20. A microscope system comprising:
the imaging optical system of claim 1; and
an image construction unit that constructs a virtual slide image by piecing together a plurality of first images captured by the imaging optical system,
wherein:
the microscope system satisfies the following conditional expression:

$$3.3 \times 10^6 \leq PX_i \leq 1 \times 10^{10} \quad (9)$$

where $PX_i$ indicates a number of pixels that constitute each individual image of the plurality of first images.

* * * * *